United States Patent [19]

Warwick et al.

[11] Patent Number: 5,266,781
[45] Date of Patent: Nov. 30, 1993

[54] MODULAR CARD PROCESSING SYSTEM

[75] Inventors: Dennis J. Warwick, Richfield; Robert W. Lundstrom, Plymouth; Joseph Zaloker, Columbia Heights; Gary Mattila, St. Louis Park; Benjamin H. Sannel; Steven G. Dorfe, both of New Hope; Theresa J. McNamara, Robbinsdale; Jeffrey P. Johnson, Rogers; Glenn R. Carney, Eagan; Steven A. Miller, Mahtomedi, all of Minn.

[73] Assignee: Datacard Corporation, Minnetonka, Minn.

[21] Appl. No.: 745,597

[22] Filed: Aug. 15, 1991

[51] Int. Cl.⁵ .................. G06K 1/00; G06K 17/00; G06F 13/00; G06F 15/46
[52] U.S. Cl. .................. 235/375; 235/380; 364/478
[58] Field of Search .............. 235/375, 380; 364/478, 364/479

[56] References Cited

U.S. PATENT DOCUMENTS

| | | | |
|---|---|---|---|
| 3,820,455 | 6/1974 | Hencley et al. | 101/18 |
| 3,883,133 | 5/1975 | Rebres . | |
| 4,194,685 | 3/1980 | Hill et al. . | |
| 4,358,102 | 11/1982 | Hoshizaki et al. . | |
| 4,384,196 | 5/1983 | McCumber et al. | 235/375 |
| 4,475,829 | 10/1984 | Goff, Jr. et al. . | |
| 4,747,706 | 5/1988 | Duea | 400/70 |
| 4,825,054 | 4/1989 | Rust et al. | 235/380 |
| 4,827,425 | 5/1989 | Linden | 364/478 |
| 4,921,237 | 5/1990 | Nubson et al. | 271/11 |
| 4,992,950 | 2/1991 | Francisco | 364/478 |
| 5,012,073 | 4/1991 | Hewitt et al. . | |

OTHER PUBLICATIONS

Patent Application 07/575,077; Dorfer et al. filed Aug. 30, 1990.

*Primary Examiner*—John Shepperd
*Attorney, Agent, or Firm*—Merchant, Gould, Smith, Edell, Welter & Schmidt

[57] ABSTRACT

Standardized card processing modules are mechanically and electrically interconnected to form an application specific card personalization machine. A controller is coupled to a communication bus which permits the controller to download card data to the card processing modules and to upload status information from the card processing modules. Each one of the card processing modules performs a different encoding or personalization function under the control of a local processor.

26 Claims, 26 Drawing Sheets

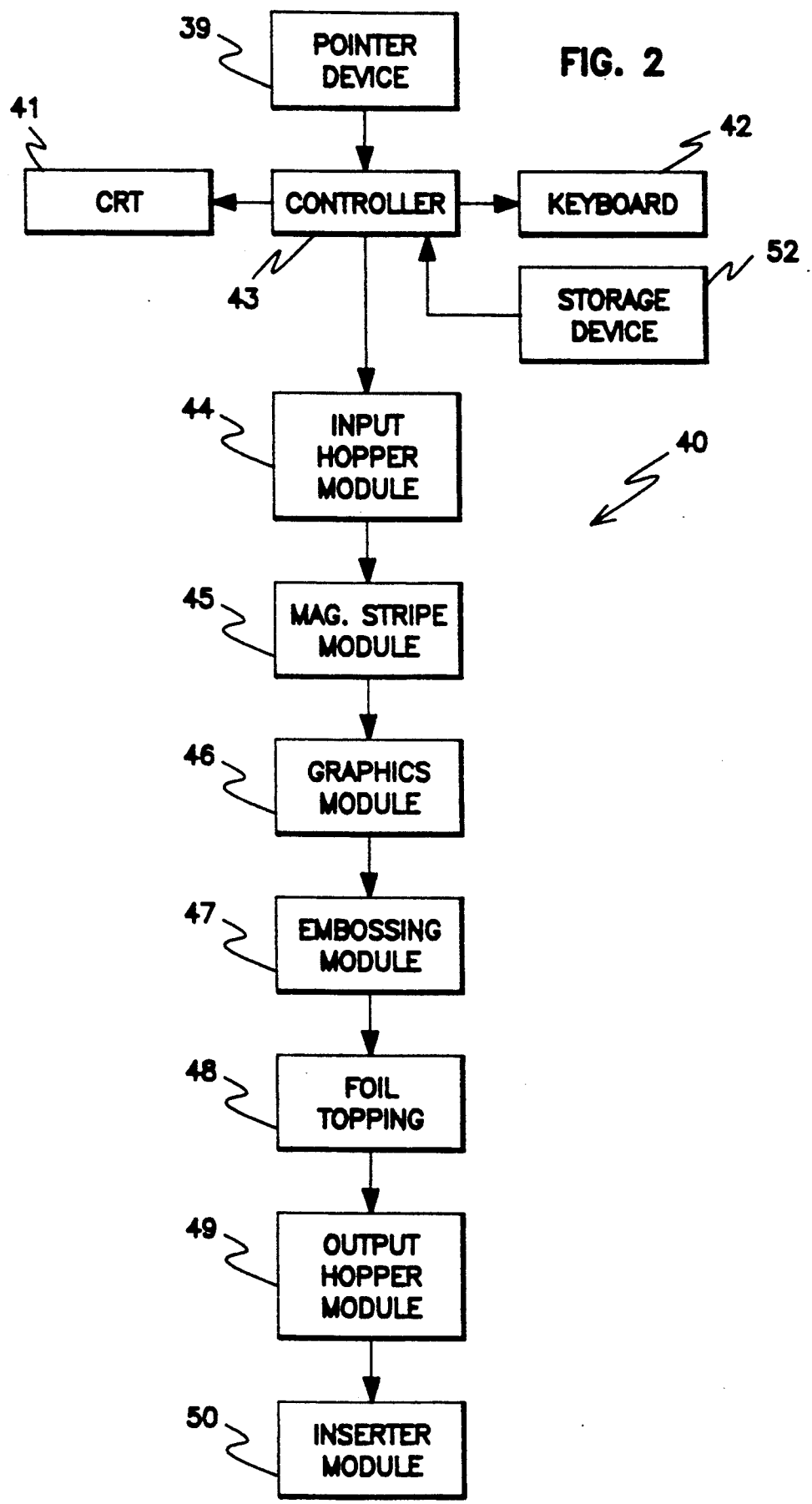

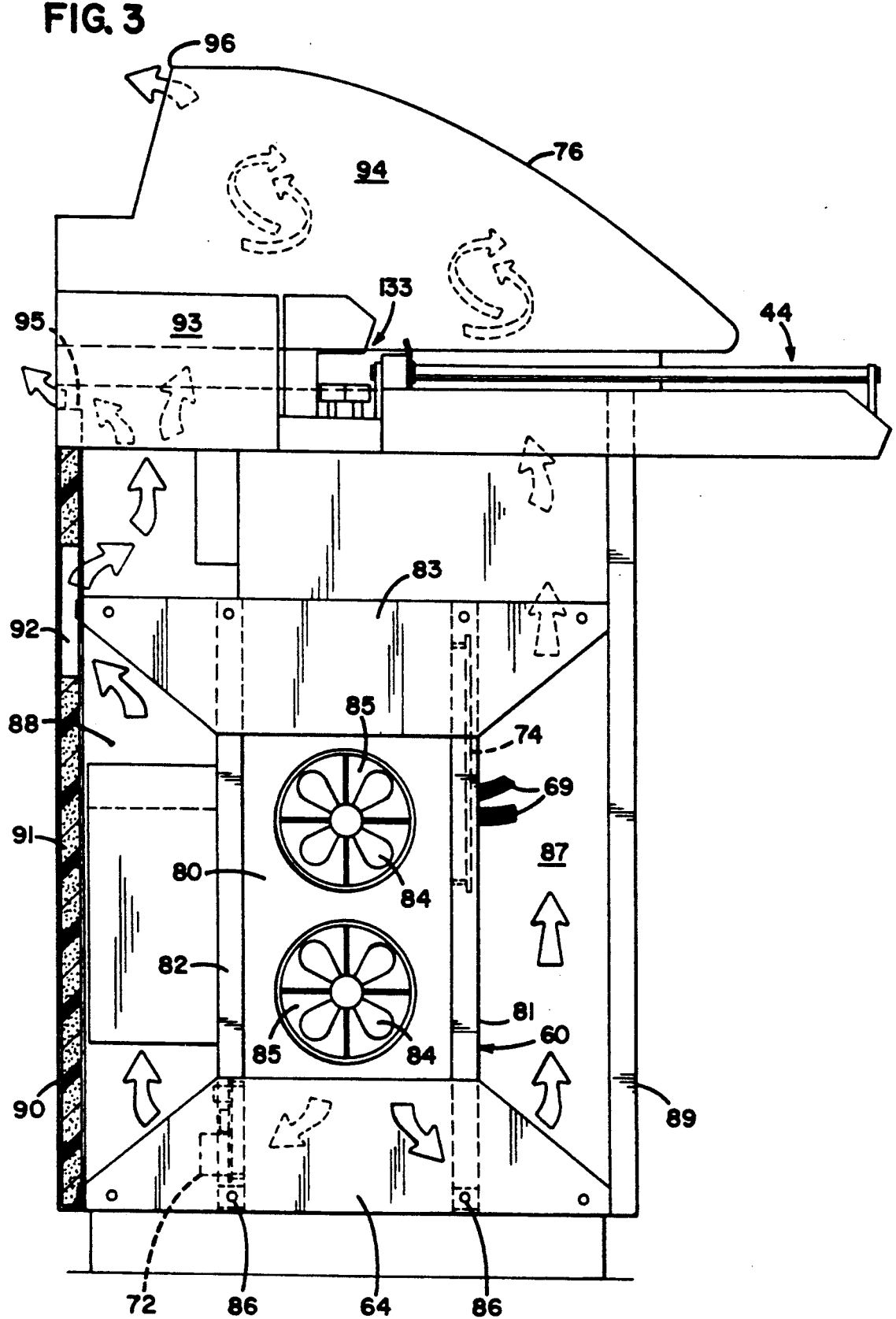

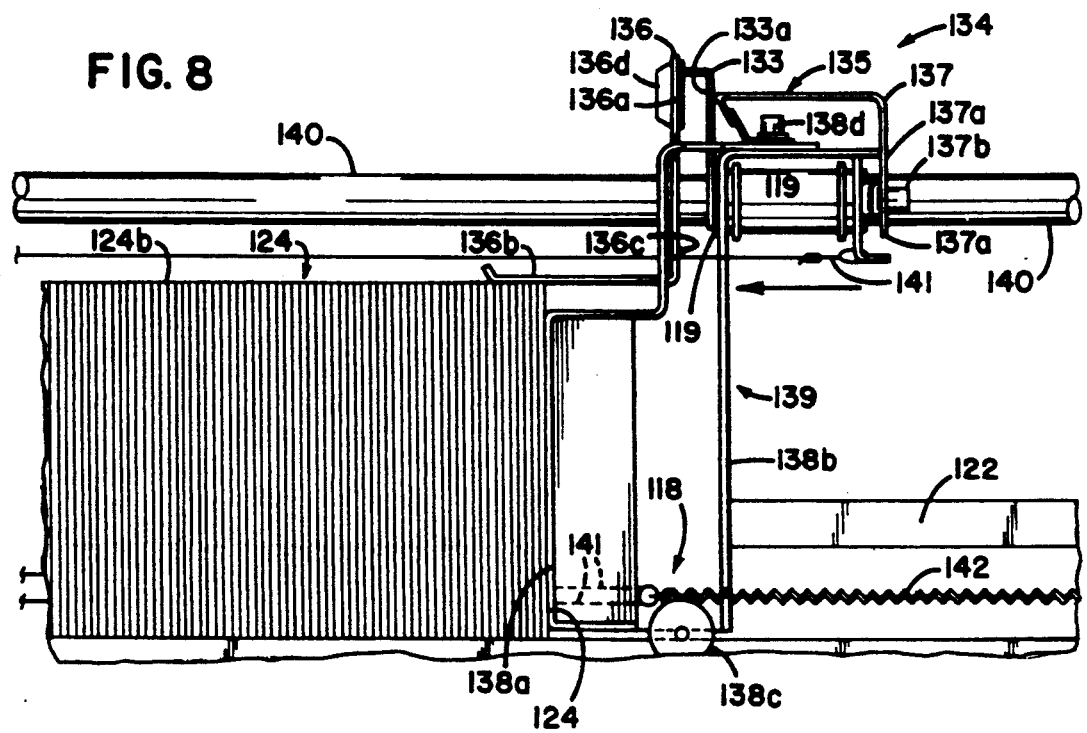
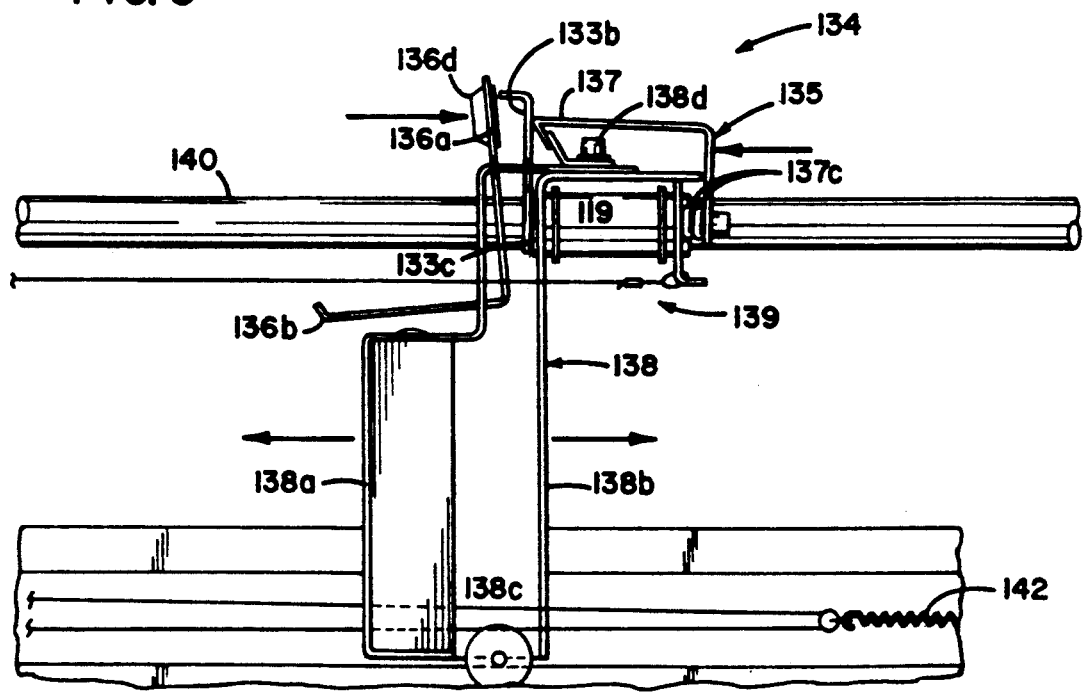

MODULAR CARD PROCESSING SYSTEM

BACKGROUND OF THE INVENTION

The present invention relates to card processing systems of the type used for producing personalized information bearing cards.

The invention is a modular card processing system which readily permits the assembly and reconfiguration of an application specific card processing system from card processing modules.

Card processing systems are used to produce a number of unique or personalized information bearing cards from unprocessed or partially processed cards. The cards being processed might already have been partially processed so as to have personalized information and/or may already include batch information, security codes, etc. Plastic cards of this type have been widely adopted for use as credit cards, identification cards, drivers' licenses and the like. Such cards may be encoded with various types of information. For example, graphic information, such as photographs and logos and the like as well as alphanumeric information such as account numbers and names, may be encoded onto the cards.

The information placed onto the cards is often referred to as card data. Card data is usually provided to the card processing system as a data structure stored on magnetic tape or other media. Prior art card processing systems, represented by U.S. Pat. No. 4,747,706, teach the inclusion of a host computer in the card processing system to read the data structures from the magnetic tape. The host computer then transfers this data to card processing electronics. The card processing electronics then generate the required card processing signals to instruct the system to perform the various card processing operations.

Existing card processing systems typically are constructed with a fixed size chassis capable of containing a given size and fixed number of card processing modules. There are inherent problems with the construction:

1. The number of card processing functions required by the application varies according to the application. This means that the chassis will, quite often, be too large or too small for a given application.
2. It is difficult to build, test, and stock final assembled card processing systems without incurring a large risk of needing to modify and re-test the final assemblies based on matching the quantity and type of card processing functions required by the application.

A problem with the prior art approach is that the card processing systems are assembled and operated as a unitary structure. Both the hardware and the software are constructed, tested and debugged as a unit. As a consequence, construction and modification of such systems is difficult and expensive.

This invention overcomes these problems by allowing the chassis to always be as large or small as it needs to be. It also allows modules to be built and tested prior to configuration into a system. In fact, modules can be built, tested, packaged and shipped to a job site prior to assembly into a system. Moreover, the present invention provides a modular card processing system which can be reconfigured at the job site so as to add or remove modules as dictated by the changing needs of the application.

A problem common to many prior art input hoppers is that they do not have a break mechanism to prevent movement of the card pusher while cards are being reloaded into the input hopper and/or to allow cards to be loaded without interrupting operations.

Another problem common to prior art systems is that their inserter/burster apparatus are not readily adaptable for use with commercially available printers such that the user can replace and interchange printers as desired depending on the desired results. For example, in some cases it is desirable to have color printing whereas in others black and white dot matrix printing is acceptable.

Yet another problem with many prior art systems is that their inserter/burster apparatus are not able to print on the top of a form. Thus the area which can be printed on the form is limited. Still another problem with many prior art systems is that they do not maintain uniform tension across the width of the paper. Yet another problem is that many do not provide a uniform tension on the form as the form is being printed by the printer and prior to feeding through to the burster mechanism.

Another problem common to prior art systems is the problem of wasted indent tape and/or blurred indenting during indenting of card surfaces. This is do to the fact that during the indenting process, the tape is not always advanced a uniform amount between the indenting of characters. If advanced to little, a previously used portion of the tape is reused causing a variation in the appearance of the character. If advanced too much, tape is wasted.

The present invention solves yet other problems associated with the prior art.

SUMMARY OF THE INVENTION

The present invention provides a card processing system which permits the use of modules which can be assembled in an arbitrary sequence to perform the required card processing functions. This objective is achieved through the use of a system architecture which distributes intelligence to the modules themselves, and which links the modules to a system controller, also referred to as a master controller, through a communication network.

In general terms, the card processing system is assembled from a family of compatible card processing modules which may be assembled together. The modules exhibit a uniform mechanical interface, electrical interface, and card process control interface. Examples of modules include: input hopper modules for entering cards into the system, magnetic stripe modules for recording information onto magnetic media, graphics modules for transcribing photographic information onto the cards, mechanical embossing modules for producing raised alphanumeric information on the cards as well as output hoppers for storing the completed cards. Each of these modules may be physically connected to its neighbors to sequentially carry out designated card processing operations.

The mechanical structures within each module, which perform specific card processing operations and card transfer operations, operate under the control of a local processor. A system controller governs a communication system which is used to instruct and interrogate the card processing modules.

In one embodiment, the system controller reads card data from a source file and sends the card data to the appropriate modules via the communication system. Card data sent to a module will then be transcribed onto a card using that modules's encoding function. After the encoding operation is complete, the module retains the encoding operation status which is on a periodic basis transmitted back to the system controller. If each card encoding operation has been successfully completed as reflected by the status received by the system controller, the system controller will issue a control message to permit the transfer of the cards into another of the modules. In this fashion cards are sequentially processed by the system.

In one embodiment cards are only moved in a downstream direction; however, it will be appreciated that in other embodiments the cards might be moved in both upstream and downstream directions.

The present invention provides a card processing system which is modular in three aspects:

1. Mechanical: New or revised card processing modules may be added as a unit to the card processing system with minimal impact on the system as a whole and on neighboring modules. The modules will all follow the mechanical interface defined herein covering the passing of cards between modules, module size, and enclosure.
2. Electrical: Each module will receive its AC power via a power bus in a standard fashion. All digital communication protocols will be over a common serial bus, and will not be dependent on position in the module stack.
3. Software: The system controller will issue a common set of commands to all modules. Additionally, any unique software components required for a module can be added via use of techniques such as dynamic linking or configuration/make facility without modifying other software components.

In one embodiment, the modules provide a common central air plenum which enables air flow through the modules from a common fan source.

The invention in one embodiment is provided with an A.C. power module which can be readily exchanged and which allows for adjustment to different outlet adapters.

In one embodiment of the invention an input hopper module is provided which has a braking feature on the card pusher such that the card pusher will brake itself and not slide toward the pick mechanism when backed away from the pick mechanism. In yet another embodiment of the input hopper, a braking mechanism is provided so as to resist movement of the card stack during picking thereby doing away with the necessity of a mass to bias the card stack toward the pick mechanism. In still another embodiment the braking mechanism is mounted on a carriage which is rotatably mounted on a shaft such that the brake mechanism and carriage can be rotated 90 degrees out of the path of the cards so that cards can be added to the input hopper during use.

Still another embodiment of the present invention provides an indent module which includes a sensor for monitoring the diameter of the tape on the takeup reel and adjustment of the rate of takeup in response to the sensed diameter of the tape on the reel so as to provide for accurate advancement of the tape so as to produce the desired spacing between letters and prevent smearing, etc. of the characters. Moreover, the tape can be advanced at a faster rate. Yet, another advantage is the relatively simple design.

Yet another embodiment of the present invention relates to an inserter which provides a paper accumulation function between the print head and the burster thereby enabling printing proximate the top of a form. Still another embodiment includes a paper accumulation function which can pivot about two axes so it can apply tension evenly all along the width of the paper. In yet another embodiment, the paper accumulation function is configured to provide a substantially uniform tension on the paper, throughout the range of movement of the paper accumulation function.

These together with other objects and advantages, which will become subsequently apparent, reside in the details of construction and operation as more fully hereinafter described and claimed.

BRIEF DESCRIPTION OF THE DRAWINGS

In the drawings, in which like reference numerals indicate corresponding structures throughout the views:

FIG. 2 is a block diagram illustrating the modules present in the embodiment of FIG. 1;

FIG. 3 is a left side elevational view in cross-section of one of the card processing modules shown in FIG. 1;

FIG. 8 is a side elevational view of an input hopper card pusher assembly present in one embodiment of the input hopper;

FIG. 9 is a side elevational view similar to FIG. 8, showing the card pusher assembly in a non-working position;

DETAILED DESCRIPTION OF THE PREFERRED EMBODIMENT

In the following detailed description of the preferred embodiment, reference is made to the accompanying drawings which form a part hereof and wherein like numerals refer to like parts throughout, and in which is shown by way of illustration a specific embodiment in which the invention may be practiced. It is to be understood that other embodiments may be utilized without departing from the scope of the present invention.

Mechanical Description

Figure 1:
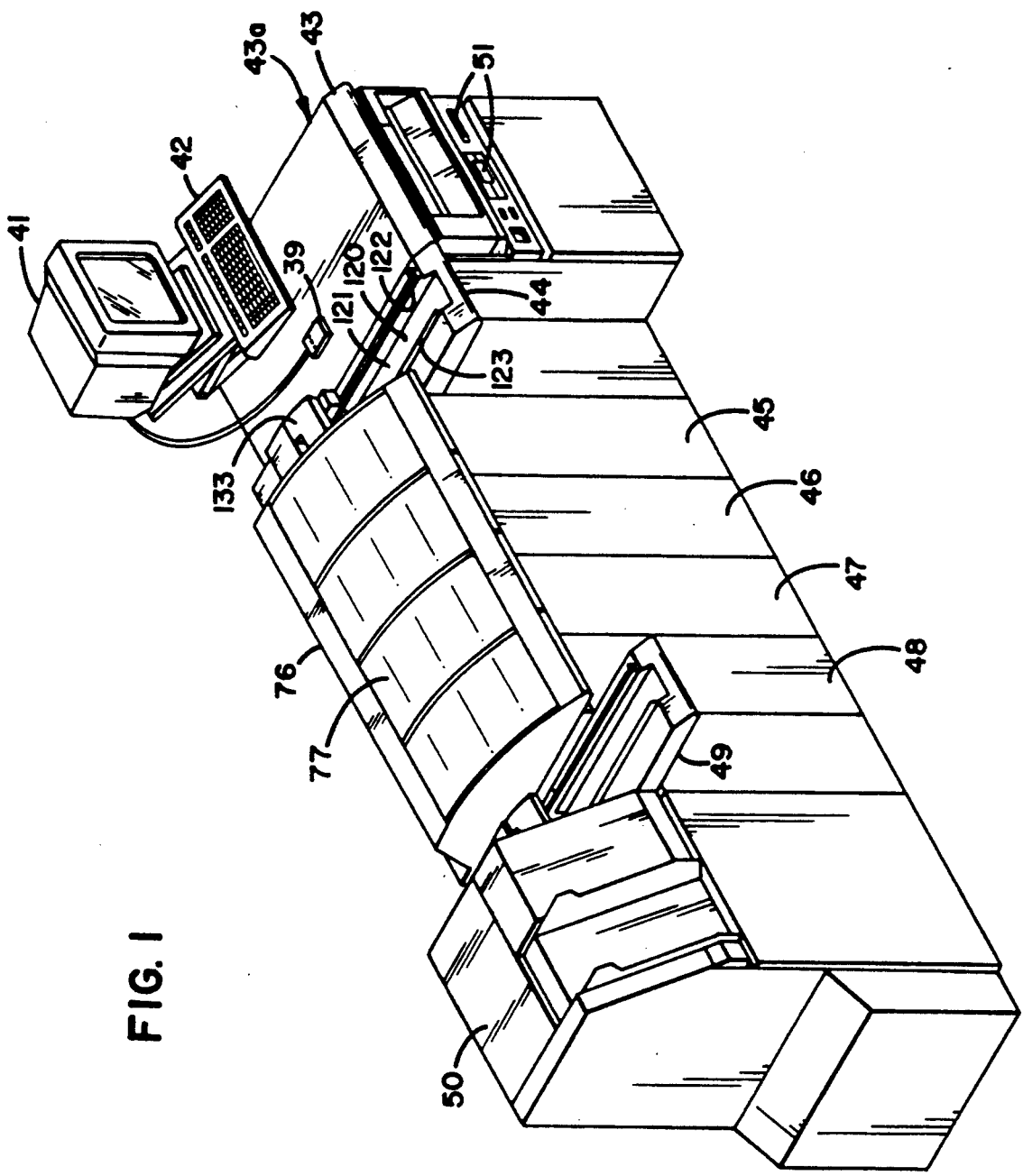
FIG. 1 is a perspective view of one embodiment of a modular card processing system in accordance with the principles of the present invention having a plurality of card processing modules.

Referring to FIG. 1, there is illustrated an embodiment of a modular card processing system 40 in accordance with the principles of the present invention showing an arrangement of sequentially integrated card processing modules, the modules being readily interchangeable, allowing for easy customization of the system for particular card processing needs through the use of a common cabinet and chassis design, and common communication means. In the system 40 illustrated, there is provided a CRT display 41 for display of system information, a keyboard 42 or a pointing device 39, such as a mouse, trackball, touch screen, pen light, etc., for operator input, and a system controller 43 which controls operation of the card processing system 40. In the embodiment shown, the system controller 43 and its associated peripherals are disposed in a rectangular housing structure 43a at the upstream end of the modules (card movement being defined in a downstream direction). The display 41, keyboard 42, and pointing device 39 are shown positioned on top of this housing structure 43a.

It will be appreciated that while in the embodiment shown and described movement is only in a downstream direction, in alternate embodiments movement of cards might be either in a downstream direction or an upstream direction. For example, a card might move upstream from one module to another module and then might move downstream to yet another module.

The system controller 43 includes a suitable processor with associated memory and in the embodiment shown, includes storage devices such as floppy and hard disk drives for storage of programs and/or card data. Other card data input devices might be present such as CD ROM, scanners, etc. Moreover, the system might be interconnected to a network for input of card data and/or other information. In one embodiment of the system controller 43, an INTEL 386SX processor is used, although other suitable processors might be used. In addition, the embodiment discussed uses OS/2 as its operating system, although once again other operating systems might be used.

The system 40 is illustrated as including a number of card processing modules, such as an input hopper module 44 for holding cards prior to processing and feeding the cards into the card processing system 40, an embossing module 47 for embossing information such as alphanumerics, logos, Japanese characters, etc. into a desired portion of a card and including an indent function for imprinting characters into a card, a magnetic stripe encoding module 45 for encoding a magnetic stripe on a card, a topping module 48 for coating portions of the card that were raised in embossing, a graphics module 46 for printing images such as optical character recognition (OCR) images, logos, photographs, bar codes, alphanumerics, etc. onto the cards, and an output hopper module 49 where the cards may be removed from the system 40. The system 40 as shown in FIG. 1 further includes an inserter module 50 where cards are attached to forms which have been printed and folded to be stacked or inserted into envelopes.

The modular system 40 described in FIG. 1 represents only one of innumerable possibilities of module combinations. For instance, a series of three alphanumeric (A/N) embossing modules may be sequentially arranged to perform a variety of embossing operations on a card, or the system 40 may just as well include only one A/N embossing module. Moreover, the present invention may be used to process any number of different types of cards made from varying types of materials.

Illustrated in FIG. 2 is a block diagram of one embodiment of a modular arrangement of the card processing system 40 shown in FIG. 1. Each of the modules are interconnected to the system controller 43 by a power bus (not shown) and a common serial bus (not shown) for transfer of electrical power and communication signals or information. In operation, the system controller 43 controls the passage of a card through the various above-described modules in a manner hereinafter described.

Figure 3B:
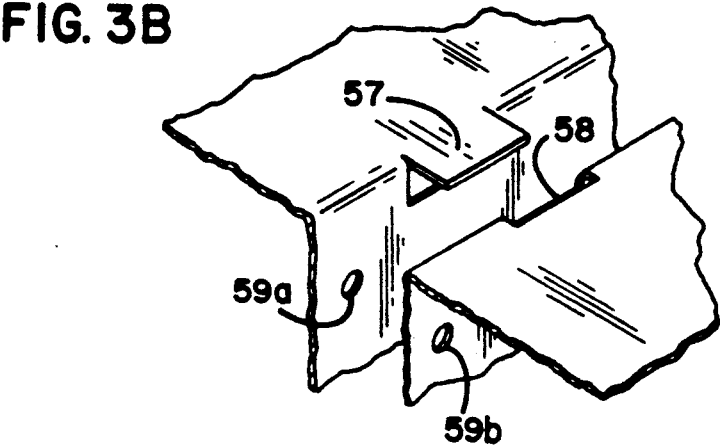
FIG. 3B is an enlarged partial view illustrating an embodiment of an alignment tab arrangement utilized to properly align the mechanical support structures of the modules.

Certain elements are common to each of the modular card processing components connected between the input hopper 44 and the output hopper 49, making possible the flexibility of adding to or modifying a card processing system. As shown in FIGS. 3 and 4, each module includes a standard chassis 60 which provides common mating surfaces and mounting hardware requirements, including structure for enabling easy replacement or addition of wheels 62 to the base 64 of the module chassis 60. A common module chassis design means that the card path inlet and outlet will be the same from one module to the next such that the inlets and outlets of adjacent modules are aligned so as to allow transfer of a card from one module to the next. In addition, the inlet and outlet of the card path for each module is provided with a suitable mechanism for ensuring proper alignment and positioning of the cards in process, as well as card detection photocells for verifying that each card is ready for transfer to the next module and that transfer has been completed. Each module is provided with uniform electrical adapters (not shown) to enable plugable interconnection of the modules by A.C. distribution wires 70 and a serial communication bus 69. The modules further include an A.C. distribution board 72 for distributing power to the module and for transferring A.C. power to its A.C. power outlet. A local module processor 75 suitably mounted on a module control circuit board 74 is present at each of the modules for converting the signals from the system controller 43 into specific card processing instructions and for controlling the local card processing functions at the module. It will be appreciated that any number of different processors might be utilized. Some modules may utilize more than one processor. One processor might be used for communications with the system controller 43 and another for data processing. In one embodiment the modules utilize the following processors:

Input Hopper Module=Intel 80C152
Mag Stripe Module=Intel 80C152 and Intel 80C196KB
Embosser Module=Intel 80C152 and Intel 80188
Topper Module=Intel 80C152
Output Hopper Module=Intel 80C152
Inserter Module=Intel 80C152 and Motorolla 68332

A card processing unit for performing a specified card processing task is situated on top of each chassis 60. A cover 76 of an appropriate width and with a window 77 for monitoring card processing production covers a portion of the card processing modules.

In addition to the elements described above, each modular chassis 60 is provided with a framework which defines a central air supply plenum 80 such that as modules are added to the system 40 the central air supply plenum 80 will remain continuous, thereby allowing unobstructed outside air flow lengthwise through the stack of card processing modules. As illustrated in FIG. 3, the framework of the plenum 80 in each module chassis 60 is defined by a plenum front panel 81 and a plenum back panel 82, the chassis base panel 64, and a plenum top panel 83. Fans 84, located in the housing containing the system controller 43, are provided for drawing outside air through air intake ducts 85 and into the plenum 80 and forcing warmer air out of openings 95,96. Openings 86 located near the base of the front and back plenum panels 81,82, as seen in FIG. 4, allow air to pass out of the central plenum 80 and to rise through channels 87,88 located in the front and rear of the chassis 60. Referring again to FIG. 3, the channel 87 in the front of the chassis 60 is defined by the plenum front panel 81 and the module front panel 89, while the channel 88 in the rear of the chassis 60 is defined by the plenum back panel 82 and the module back panel 90. As can be seen in FIG. 3, the module back panel 90 is insulated with a sound absorbing material 91, a portion of which has been removed to create an air passage 92 to allow air to rise beyond the plenum top panel 83. Air flow is allowed to continue through the card processing area 93, and into the cover area 94, where the warmer air is forced out of the unit through the opening 95 situated in the module back panel 90 and the vent 96 in a rear area of the cover 76.

Figure 3A:
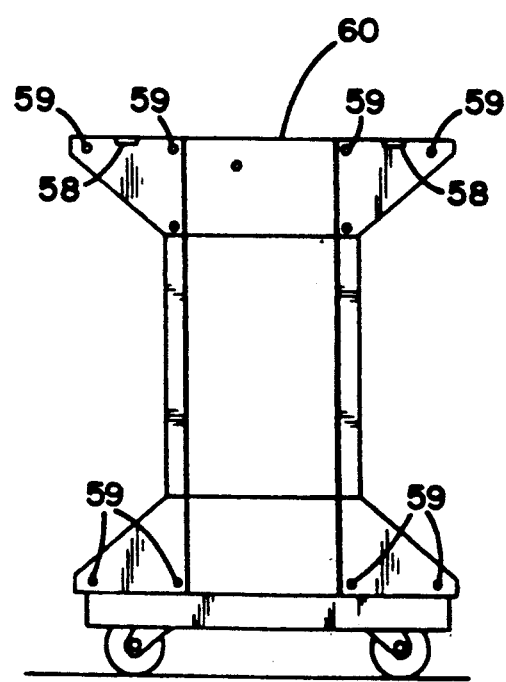
FIG. 3A is an end elevational view of a module illustrating a profile of its mechanical support structure.
Figure 4:
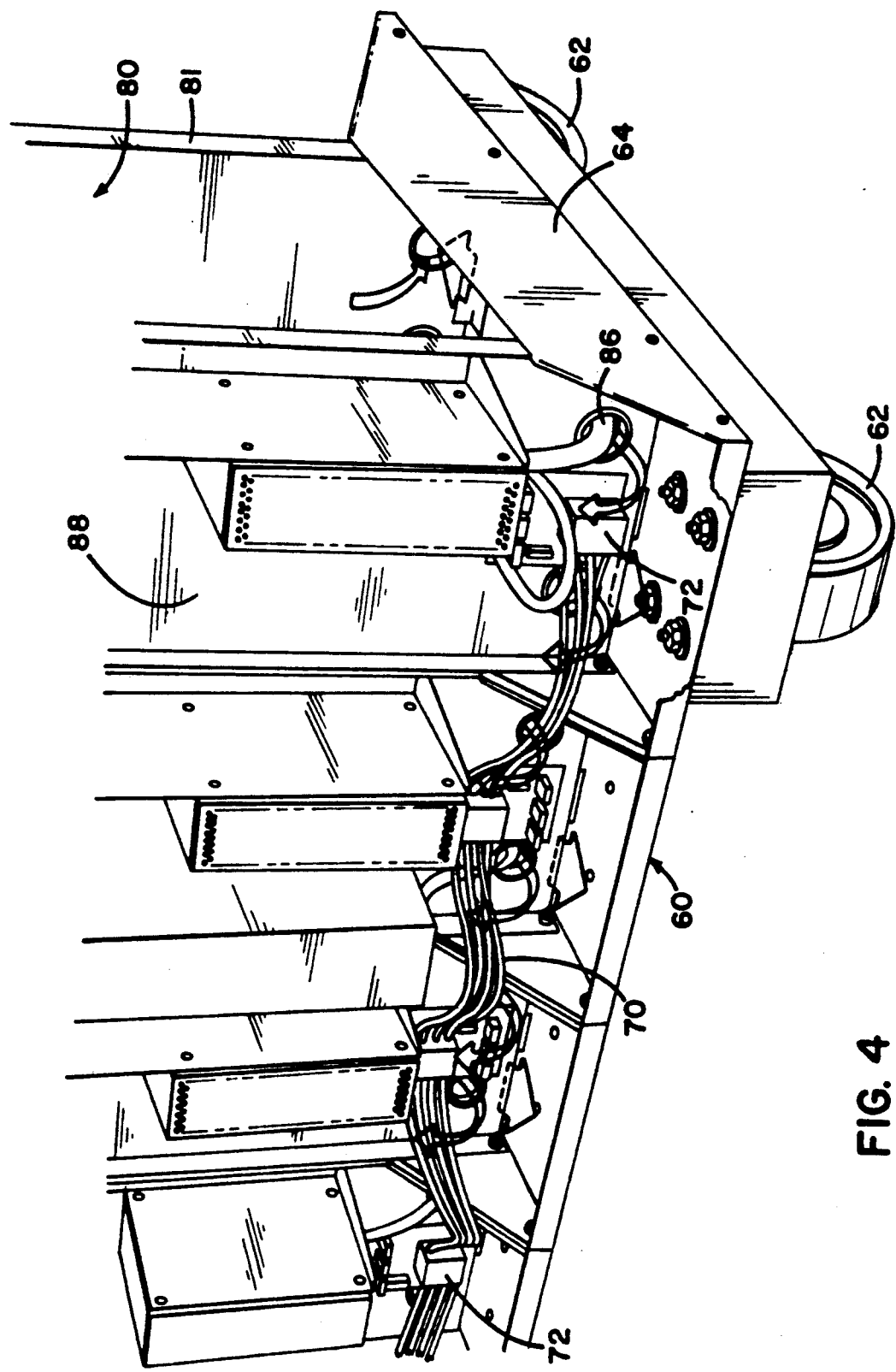
FIG. 4 is a perspective view of a fragmentary portion of the lower back portion of the card processing modules shown in FIG. 1.

Illustrated in FIG. 3A, is an end profile view of the module chassis 60 or mechanical support structure. As illustrated each chassis 60 has four openings 59 proximate a bottom surface and four openings 59 proximate a top surface. The openings 59 are vertically and horizontally aligned from module to module. Moreover, on one side of the module (upstream or downstream side), the module chassis 60 includes two slots 58 for receipt of corresponding alignment tabs 57 of an adjacent module. The openings 59a on one side of the module are threaded while the openings 59b on the other side of the module are not threaded. Thus when attaching or replacing modules it is very easy to interconnect them and insure that they are aligned properly so that the mechanical parts such as the card track from one module to the next is aligned. The alignment tabs 57 are inserted into their corresponding slots 58. Next thread fasteners are inserted into the apertures 59b without threads and are threaded into the threaded apertures 59a of the adjacent module. It will be appreciated that the apertures 59, slots 58, and tabs 57 may be either on the downstream or upstream side. However, once a side is chosen, then in the embodiment shown, the same side must be chosen for all modules so that all modules will have the same configuration and readily connect together.

In one embodiment the apertures 59 horizontally spaced 4.5 inches apart and vertically spaced 21.88 inches apart. The air plenum is 8 inches wide. The module chassis 60 is 23 inches from top to bottom and has a width of 20 inches without its removable panels on the front or back. The card path is defined as 7.25 inches above the top of the chassis 60.

The module chassis 60 is shown as having generally an I-shaped profile with the plenum 80 being disposed down the midportion of the module. Each of the modules might be mounted on adjustable wheels or they might be totally supported by their adjacent modules. It will be appreciated that in some embodiments the modules might be simply aligned with each other and not necessarily fastened together. The alignment tabs 57 might be simply inserted into the slots 58 to insure proper alignment.

Figure 5:
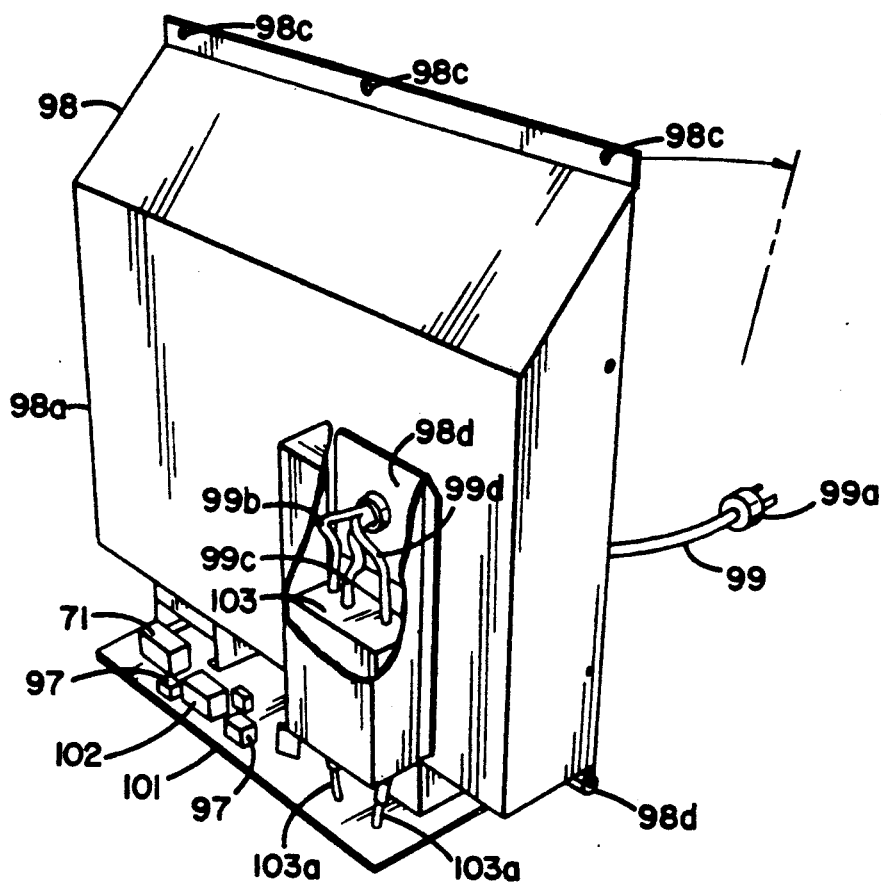
FIG. 5 is a perspective view of the inside of an alternating current (AC) power input module, electromagnetic interference (EMI) filter, and AC power circuit board present in the embodiment of the card processing system shown in FIG. 1.

The present invention provides a structure within the system controller 43 for variable adjustment of the system so as to utilize the external power source available, which typically may be 110 volts or 220 volts single phase or 220 volts two phase. An A.C. power input module 98 is situated beneath a rear access panel of the system controller 43 housing structure. Referring now to FIG. 5, the A.C. power input module 98 includes a housing 98a which is mounted pivotally mounted along its bottom edge by a hinge 98b to the system controller housing structure. Apertures 98c are provided to enable insertion therethrough of fasteners into corresponding apertures in the system controller housing structure. When one wishes to access the A.C. power input module, one can simply loosen these fasteners and pivot the housing 98a outward. The housing 98a cooperates with the system controller housing to provide a recess or cavity on the outside of the system controller housing. This recess or cavity can be used for storage of manuals, electrical cords, etc.

Interconnected to the A.C. power input module is an external power cord 99 which includes a suitable end plug 99a for plugging into an available power outlet (in this embodiment the power cord 99 is shown as having three wires 99b,c,d). It will be appreciated that should the configuration of the power outlet not correspond to the plug 99a, the plug 99a can be readily replaced. In the embodiment shown the power cord 99 is externally mounted to the housing 98a by a plate portion 98c.

The housing 98a is mechanically mounted onto an A.C. power circuit board 101. Mounted on the board 101 are various electrical components such as a circuit breaker 100, a solid state relay 240, electromagnetic interference (EFI) filter 103, a terminal block 71, A.C. universal outlets 97, etc. The specific configuration and layout of the A.C. power circuit board 101 is discussed hereafter. The EFI filter 103 is mechanically mounted to the housing 98a. In addition wires 103a from the EFI filter are soldered to electrically conductive traces (not shown) on the board 101 so as to provide the electrical connection between the board 101 and the power cord 99. The board 101 includes suitable electrical traces to electrically interconnect the electrical circuits which are mounted thereon. In one embodiment, copper traces equivalent to twelve to fourteen gauge copper wire are used.

The housing 98a is mechanically attached to the board 101 through various ones of the components on the board 101, e.g., the circuit breaker 100. Thus when the housing 98a is pivoted outward, the board 101 is pivoted therewith. Moreover, as shown, the board 101 in the preferred embodiment has a greater width than the housing 98a such that a portion of the board 101 and its electrical components are readily accessible from the outside of the system. Moreover, should it be necessary to remove the A.C. power input module, the entire module can be removed as a unit by releasing the housing 98a at its hinges from the system controller and electrically disconnecting the modules, various peripherals, system controller circuit board, etc. from the A.C. power board by use of plugable connectors.

Figure 6:
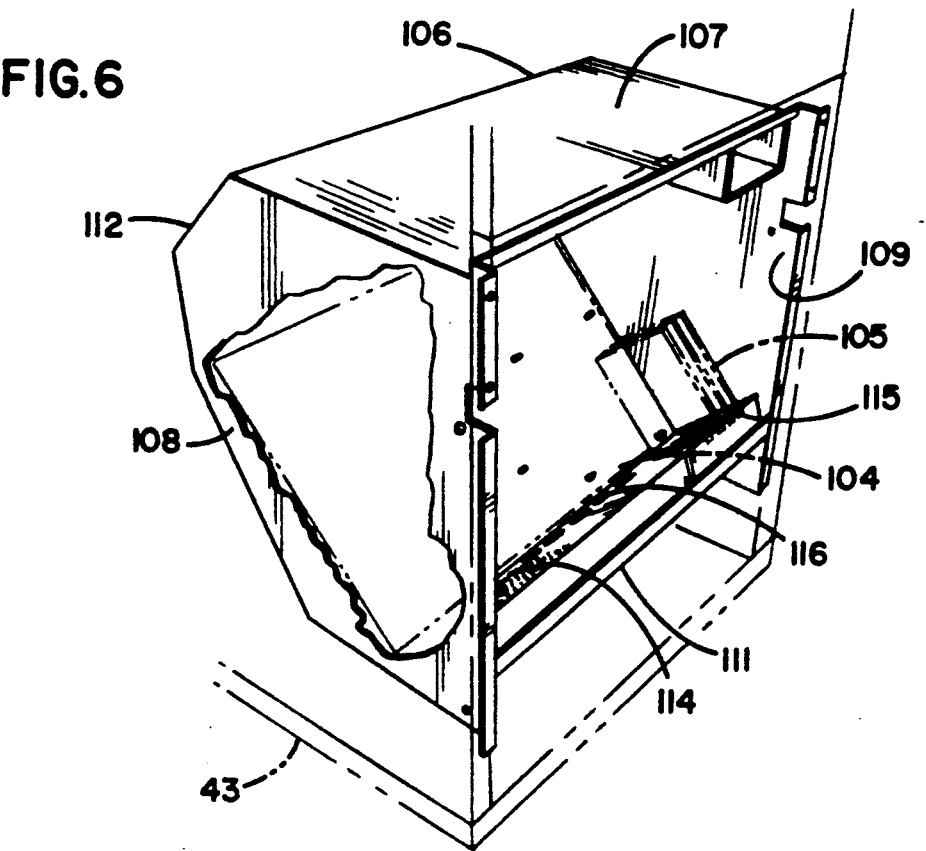
FIG. 6 is a perspective view of a system controller circuit board housing of the card processing system shown in FIG. 1.

As shown in FIG. 6, in order to facilitate access to a system controller main circuit board 104 and circuit cards 105 which might be mounted thereon, a removable circuit board housing 106 with an angled circuit board mounting base is provided in a lower front region of the controller chassis 43. The embodiment of the circuit board housing 106 as illustrated may be formed of sheet metal and is entirely enclosed except for a substantial access opening in the front of the housing 106. The circuit board housing 106 consists of a top panel 107, a left side panel 108, a right side panel 109, a bottom panel 110 which is rotated at a 45-degree angle relative to the front plane of the controller 43, a short front panel 111 which is formed at a right angle to the bottom panel 110 and concludes where it meets the plane defined at the front of the housing 106 by the leading edges of the side panels 108,109 and top panel 107, and a short back panel 112 which completes the enclosure of the housing 106.

Suitable structures, such as brackets or fasteners, are provided for mounting the circuit board housing 106 in the support housing of the system controller 43. Standoffs 113 are provided in the angled bottom panel 110 for mounting the system controller board 104 to the housing 106. Openings 114 have been provided in the short front panel 111 and back panel 112 for allowing air to flow through the housing 106. Slots 115 have also been provided in the front panel 111 for supporting circuit cards 105 such as serial computer system interface and bus interface cards as they are added to the system controller circuit board 104. In addition, openings 116 are also provided in the front panel 111 so that access to the controller circuit board 104 may be made from the front of the unit 43, thereby facilitating maintenance of the controller circuitry. These openings include elongated slots to allow access to the circuit cards 105 also referred to as expansion cards. In the embodiment shown, the system controller circuit board includes two circuit cards; a serial computer system interface (SCSI) card and a bus interface (BIF) card. Additional cards might be present such as a communication card for modem communications, a network card for communications on a network, etc.

The card processing system 40 as shown in FIG. 1 includes an input hopper module 44 for storing and feeding cards to the card processing system 40. It will be appreciated that any number of input hopper, card picking apparatus might be utilized with the present invention. In particular the input hopper, card picking apparatus described in U.S. Pat. No. 4,921,237, issued May 1, 1990, hereby incorporated by reference, might be used. Input hoppers of this type utilize a reciprocating suction cup mechanism to individually pick the cards from a stack of cards in a receptacle of the input hopper. However, the input hopper novel features disclosed herein offer several advantages over prior art devices.

Figure 7:
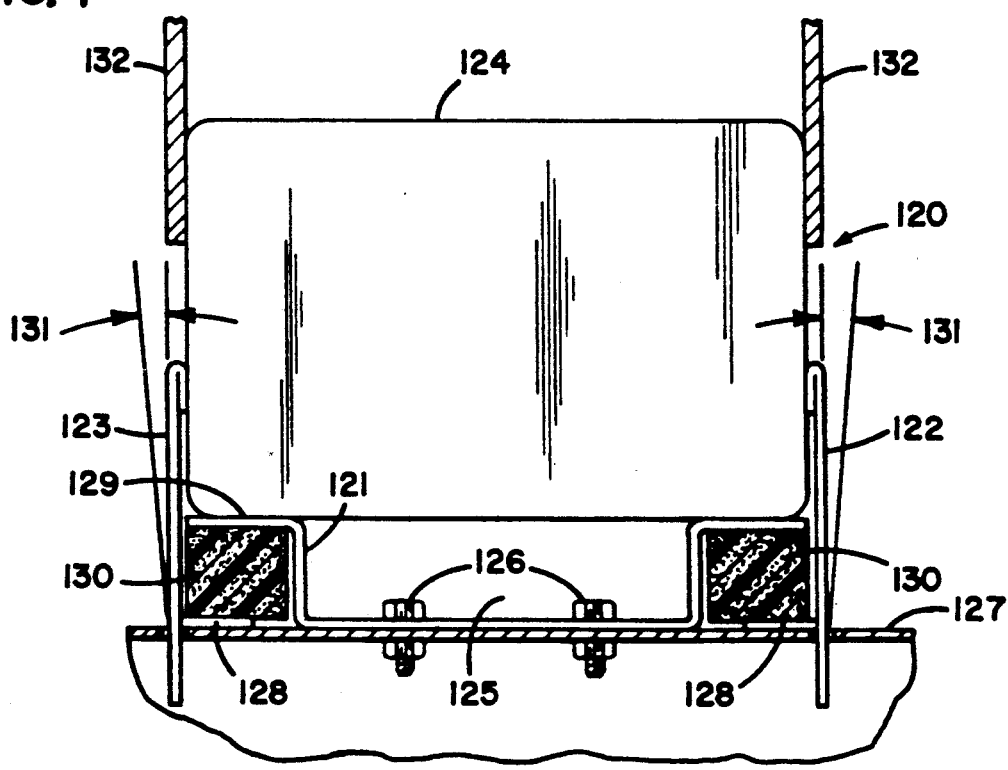
FIG. 7 is a cross-sectional view of a input hopper card retainer structure of the card processing system shown in FIG. 1.

The input hopper 44 of the present embodiment includes a hopper receptacle 120 for receiving a stack of cards 124. As seen in FIG. 7, the hopper receptacle 120 is defined by a bottom support plate member 121, a right side guide rail member 122, and a left side guide rail member 123, the guide rail members 122, 123 being substantially parallel to each other when undisturbed. The bottom support plate member 121 is generally the same width as the plastic cards 124 being processed. A trough 125 is defined in the bottom surface of the support plate 121 which is substantially narrower than the width of the base of the plastic card stack 124 and which allows for clearance beneath the stack 124 for support plate mounting hardware 126 as well as finger clearance for easy removal of a portion of the card stack 124. The left and right side guide rail members 122, 123 project into slots in the support structure 127 for angular movement pivoting at the point at which the guide rail members 122, 123 mate extend through the slots in the hopper support structure 127. An extension 128 projects perpendicularly from each guide rail member 122, 123 to a point beneath the card-engaging surface 129 of the card support plate 121.

A strip of resilient material 130 is mounted between the extension 128 and the card support plate 121 for biasing the guard rail members 122, 123 into a position perpendicular to the card support plate 121 and, therefore, parallel to the sides of the card stack 124. However, the resilient material allows the guard rail members 122, 123 to be pivoted outward as the resilient material 130 will compress as the extension 128 forces into it when pivoting the rail members 122, 123. The angular movement 131 of the guide rails 122, 123 allows for a temporary expansion of the hopper receptacle 120 when a card container 132 is introduced during loading or unloading of cards. It will be appreciated that in alternate embodiments, only one of the guide rails 122, 123 might be pivotal. The end of the hopper is open such that when placing the box of cards into the hopper, the user can hold the cards in place while pulling the box out the end of the hopper.

Another feature of the input hopper module 44 is the card pusher assembly 134, which forces the cards 124 toward a card picking mechanism (not shown) of the input hopper module 44. The card pusher assembly 134 as shown in FIG. 8 includes a handle 135 comprising a first lever 136 and a second lever 137, the levers 136, 137 being pivotally mounted on a carriage arrangement 139. A card stack pusher plate assembly 138 is supported by the carriage, a face portion 138a of the card pusher 138 providing the surface which engages the trailing end 124a of the card stack 124 with a back portion 138b including an aperture for mounting the pusher assembly 138 on a bearing 119 which in turn is slidably mounted on a cylindrical guide shaft 140. The back portion 138b is also illustrated as riding on a bearing 138b. The face and back portions 138a,b are fastened together by a fastener 138d.

The handle 135 and carriage arrangement 139 are slidably mounted on the horizontal guide shaft 140 which is situated alongside the card receptacle 120. A cable 141 is attached at one end to the carriage 139, the opposite end of the cable 141 being fixed to a biasing mechanism. In the preferred embodiment, a spring 142 is used for biasing the card pusher assembly 134 toward the card feeder mechanism 133 of the input hopper 44. Of course an alternative approach would be to use a weight.

Figure 9A:
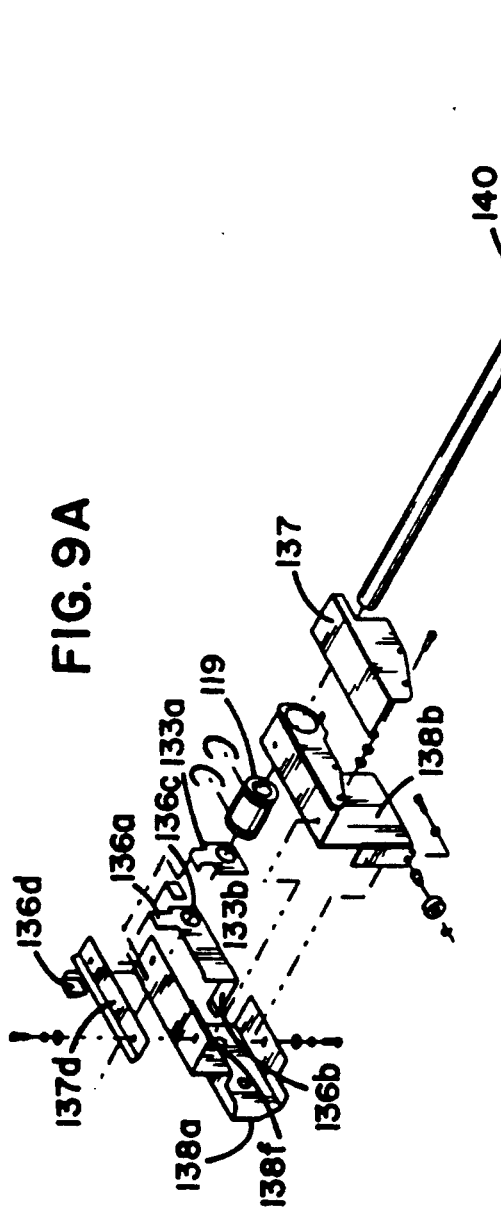
FIG. 9A is an exploded view of one embodiment of a card pusher assembly.
Figure 9B:
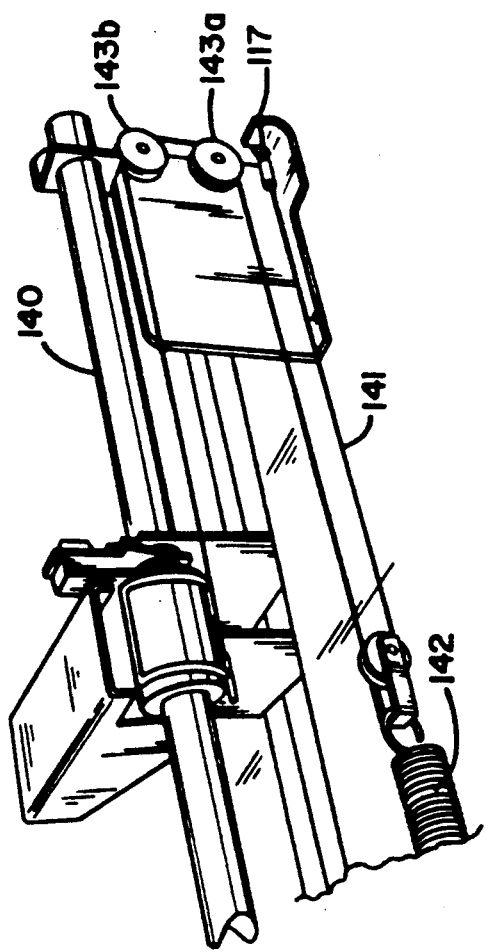
FIG. 9B is a partial side, perspective view of the card pusher assembly shown in FIG. 9A.

As shown in FIG. 9B, the cable wraps around two pulleys 143a,b proximate the card pick end of the input hopper and then feeds away from the pick end to the spring 142 which is suitably mounted to the support framework of the input hopper. The cable 141 is attached to the spring 142 by a pulley 118 and is mounted at location 117 proximate the card pick end of the input hopper. The spring thus serves to bias the card pusher assembly 138 toward the card pick end.

The first lever 136 of the handle 135 includes a tab portion 136a having a pad 136d and an outwardly projecting leg 136b which is perpendicular to the tab portion 136a, and which contacts the top surface 124b of the card stack 124. In addition, the tab portion 136a of the first lever 136 is provided with a circular opening 136c through which the guide shaft 140 passes. The tab portion 136a rests adjacent a cut away portion 138e of the face plate 138a and the leg portion 136b projects through an aperture 138f in the face plate toward the pick end of the hopper.

Referring to FIG. 8, the second lever 137 is resiliently mounted at a first end 137a to the carriage assembly 139 by a fastener 137b. Two o-rings 137c are placed between the first end 137a and the back portion 138b of the pusher assembly 138. A bracket 137d is mounted onto the face and back portions 138a,b pusher assembly so as to retain the second lever 137 on the carriage.

A first end 133a of a brake lever 133 projects through a slot 138g in the face plate 138a between the first and second levers 136 and 137, while a second end 133b of the brake lever 133 is provided with a circular opening 133c through which the guide shaft 140 slidably passes. The first end 133a of the brake lever 133 extends up through the slot 138b in the face plate 138a and is bent 90 degrees toward the first lever 136. The brake lever 133 pivots on the shaft and locks in place as the carriage is moved toward the front of the input hopper, away from the card picking end of the input hopper. This restrains the carriage and card stack from further motion and therefore provides the force necessary to resist movement of the card stack when cards are being picked so as to compress the suction cup of the card picking mechanism while yet allowing some initial motion of the card stack toward the card picking mechanism so that the edges of the card being picked can separate from the rest of the card stack. In one embodiment this range of motion is 0.060 to 0.120 inches.

The brake lever eliminates the need for additional mass on the card pusher assembly 138 as is typically required of prior input hoppers. As the spring 142 at the end of the cable 141, pulls the pusher toward the feeder mechanism, the linear bearing 119 aligns the brake lever 133 with respect to the shaft 140 thereby unlocking the brake lever 133 which allows the card pusher assembly to move the card stack toward the card picker mechanism at the back of the input hopper and in position for the next card pick cycle. When the picking mechanism is forced against the cards, the linear bearing 119 moves away from the brake lever 133, thereby allowing the brake lever 133 to pivot and bind against the guide shaft thereby preventing further movement of the card stack.

When the levers 136 and 137 are pinched together, the second lever 137 forces the bent tab portion on the brake lever 133 into engagement with the first lever 136 thus aligning the apertures of the brake lever 133 and the first lever 136 with the shaft 140 such that the carriage is free to move in either direction.

When the leg 136b of the first lever 136 is in contact with the card stack 124 as shown in FIG. 8, the opening 136c in the tab portion 136a of the first lever 136 is aligned with the guide shaft 140, allowing for unrestricted movement of the pusher assembly 134 in either direction along the guide shaft 140.

Referring now to FIG. 9, when the leg 136b is not in contact with the card stack 124, the tab portion 136a of the lever 136 pivots forward, causing the edges of the opening 136c to bind with the guide shaft 140, thus preventing further movement of the pusher assembly 134 toward the feeder mechanism 133.

The system operator may reposition the pusher assembly 134 by grasping the handle 135 in such a way as to "pinch" together the tab portion 136a of the first lever 136 and the first end 137a of the second lever 137. When the system operator releases the handle 135, the pusher assembly 134 is again prevented from movement by the first lever 136 and the brake lever 138.

In the preferred embodiment, the carriage 135 can be rotated about the shaft 140 so as to facilitate loading of cards into the input hopper. For example, cards can be loaded in front of the pusher plate 138 on the side away from the pick mechanism while the input hopper is inputting cards into the system. The carriage 135 can then be rotated 90 degrees so as to be out of the way and the cards moved toward the pick mechanism. The carriage 135 can then be pulled back toward the operator away from the pick mechanism, and rotated back into position so as to retain the entire card stack. This can be done relatively quickly during operation of the system so as eliminate the need to stop the system to reload the input hopper.

Figure 10:
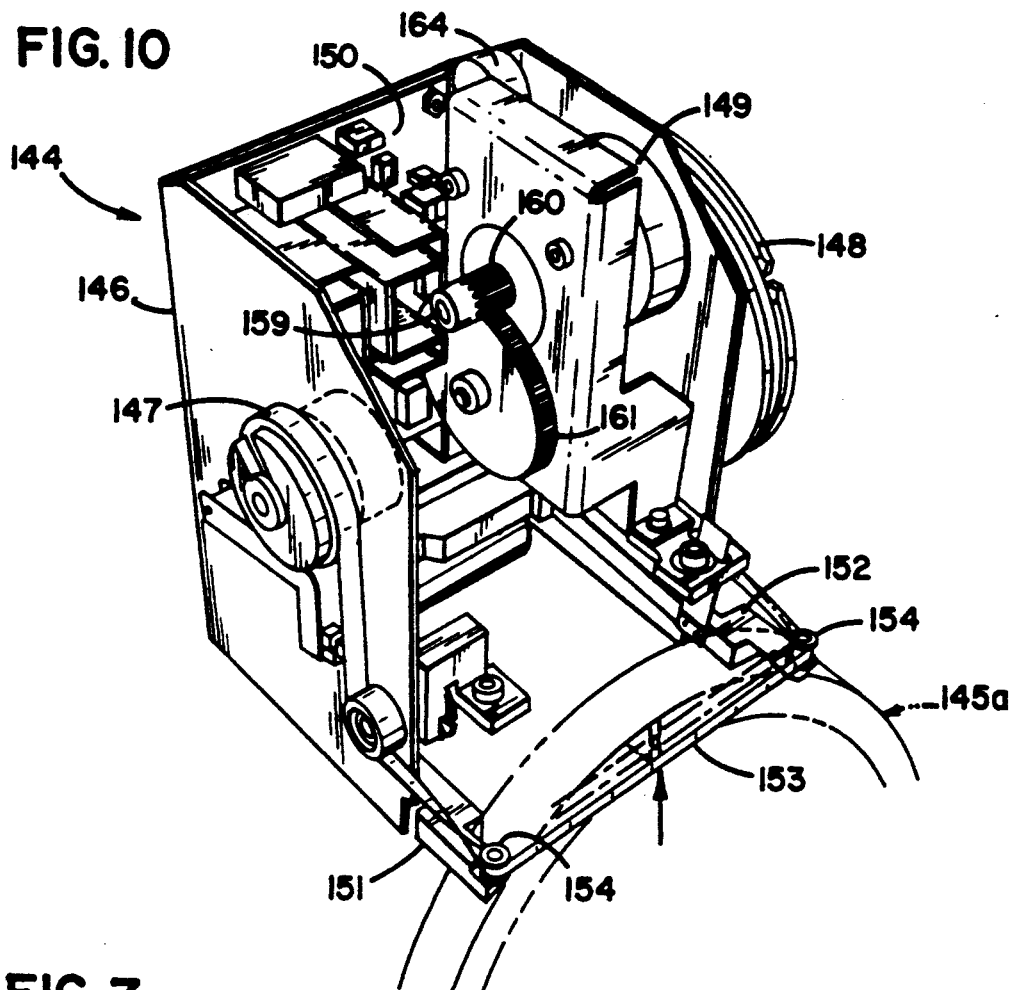
FIG. 10 is a perspective view of an indent module of the card processing system shown in FIG. 1.
Figure 11:
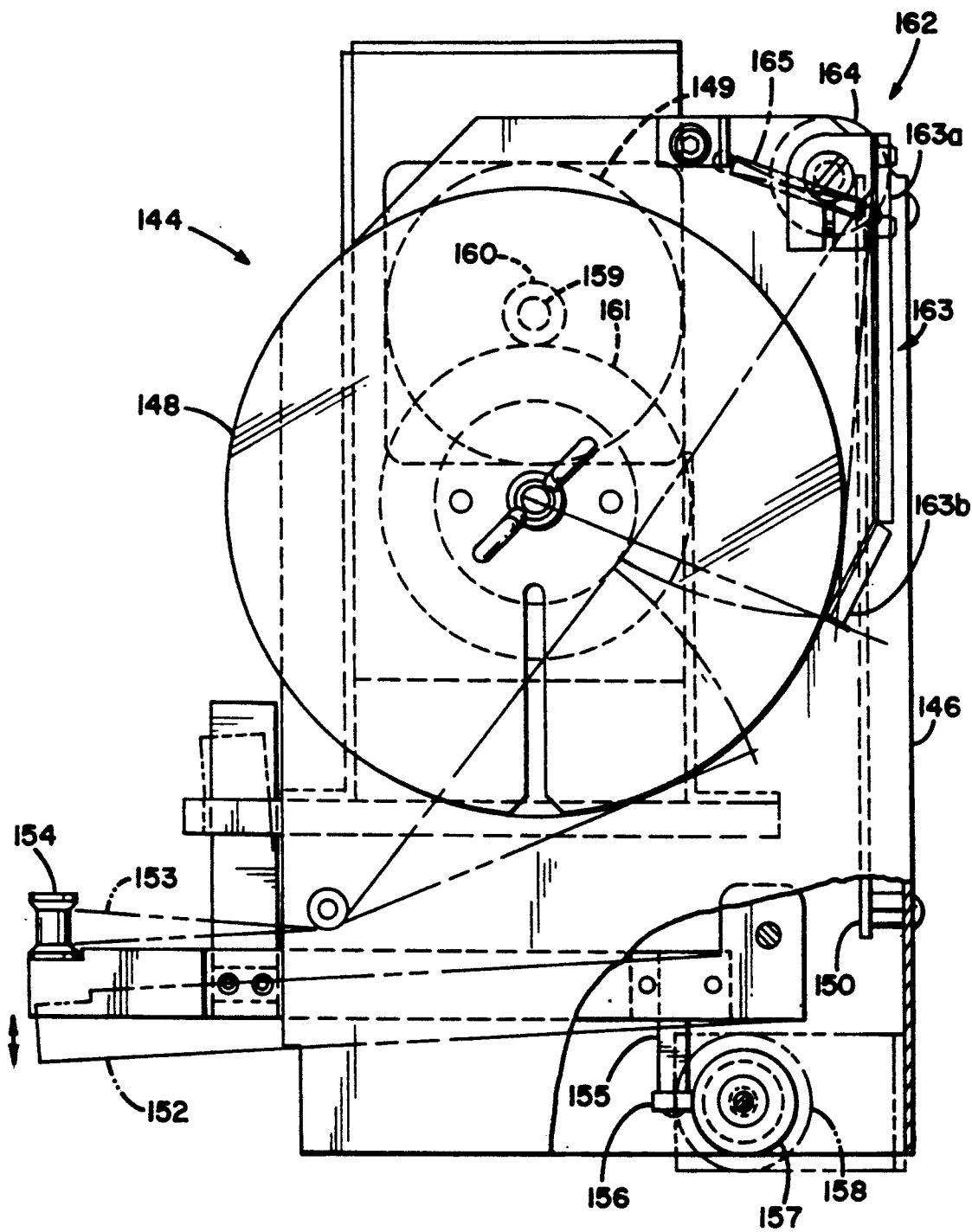
FIG. 11 is a right side elevational view of the indent module of FIG. 10.

The alphanumeric embossing module 47 of the above-described card processing system 40 is provided with an indent module 144, the structure and use of which will now be discussed. The indent module 144 of the present invention is an apparatus for imprinting information on the back and/or front of a card. In the embodiment shown, this is done while the card is alternately undergoing an embossing operation. However, the indent module might of course be used without an embosser or might be located in a separate module apart from the embosser. An indent module 144 is illustrated in FIGS. 10 and 11. As shown in FIG. 10, the indent module 144 is situated in the alphanumeric embossing module 47 adjacent the embossing wheel 145. The indent module 144 comprises a housing 146 on which is mounted a printing tape supply reel 147, a tape takeup reel 148, a motor 149 for driving the takeup reel 148, a control circuit board 150, and left and right guide arms 151, 152 for positioning the tape 153 between the card and an embossing wheel 145.

In the embodiment of the alphanumeric embossing unit 47 shown, a rotary character embossing/indenting wheel 145 has two portions 145a,b situated on either side of the card to be embossed and/or indent printed. In the embodiment shown, one embossing wheel portion 145a employs positive, or raised, characters, whereas the other embossing wheel portion 145b employs corresponding negative, or sunken, images. When indent printing is desired on the card, the positive embossing wheel 145a is used to impress characters into the surface of the card. The negative embossing wheel portion 145b will rotate to a blank face to prevent the image imprinted on the card from raising an image on the opposite side of the card. It is to be appreciated that the characters required for imprinting on the card will be mirror images of characters used in the embossing which is read on the opposite side of the card. Therefore, in a situation where embossing and indenting are performed at the same module, the positive embossing wheel portion 145a will necessarily be provided with two sets of characters for embossing or imprinting information on either the front or the back side of a card. It will be appreciated that the embossing wheel 145 may have any number of different configurations. For example, the embossing wheel might actually comprise two separate wheels, the wheels might only include embossing and/or indenting characters, etc.

The indent module 144 as depicted in FIG. 10 includes a mechanism for coloring the characters imprinted on the surface of the card. The printing tape 153 from a supply reel 147 is passed around guide rollers 154 positioned on the ends of guide arms 151, 152 which extend from the indent module 144. The guide arms 151, 152 position the tape 153 between the side of the card to be imprinted and the positive embossing wheel portion 145a, however the guide arms 151, 152 normally position the tape 153 out of the embosser's path until indenting in the side of the card is desired.

As shown in FIG. 11, a tape guide arm 152 is also provided with an extension 155 and a roller 156 situated on the distal end of the extension 155. The extension roller 156 engages the surface of a cylinder 157, the diameter of the cylinder 157 being greater at an end opposite the point of engagement with the extension roller 156 when the indent module 144 is at rest. The cylinder 157 slides on an axis perpendicular to the axis of the guide arm extension roller 156, its position being determined by a solenoid 158 in communication with the module's processor.

A signal from the module' processor 75 causes the solenoid 158 to move the cylinder 157 such that the extension roller 156 contacts an ever-increasing diameter of the cylinder 157, thereby causing the guide arms 151, 152 to raise and resulting in the tape 153 being positioned between the surface of the card and the positive embossing wheel 145a for coloring the characters being imprinted into the surface of the card.

Referring now to FIGS. 10 and 11, the takeup drive motor 149 is provided with a drive shaft 159 having a gear 160 attached thereto. The gear 160 in turn engages a gear 161 associated with the takeup reel 148. The amount of rotation of the takeup reel 148 is adjusted as the amount of tape on the takeup reel 148 increases so as to maintain a constant amount of tape deployment between characters. This insures that tape is not wasted and that there is no reuse of a previously used tape area. A takeup sensor 162 senses the diameter of the takeup reel 148 as it changes due to used tape being wound onto the takeup reel. The sensor 162 provides the module's processor 75 with a signal representative of the sensed diameter. The module's processor then adjusts the amount of rotation of the drive motor 149 driving the takeup reel 148 so that a constant amount of used tape is taken up onto the takeup reel 148 between the indenting of individual characters on the surface of the card. In a preferred embodiment of the invention, the drive motor 149 is a stepper motor although other drive mechanisms might be utilized.

The takeup sensor 162 as illustrated in FIG. 11 comprises a takeup sensor arm 163, mounted to a potentiometer 164, and a spring 165 for biasing the sensor arm 163 against the tape 153 accumulating on the takeup reel 148. The potentiometer 164 is mounted to the indent module housing 146 such that the shaft of the potentiometer 164 is parallel to the axis of rotation of the takeup reel 148. A first end 163a of the sensor arm 163 is mounted to the potentiometer 164, while a second end 163b of the sensor arm 163 is disposed toward the tape 153 in the takeup reel 148 by the spring 165.

As the tape 153 accumulates on the takeup reel 148, the diameter of the core of the takeup reel 148 increases, thus causing the second end 163b of the sensor arm 163 to move outwardly from the center of the reel 148. As the second end 163b of the sensor arm 163 moves, the movement causes the shaft of the potentiometer 164 to turn, thus varying the potential as read by the indent module's processor 75. As the potential varies, the indent module's processor 75 will correspondingly adjust the amount of rotation of the drive motor 149 which in turn reduces the amount of rotation of the takeup reel 148 by adjusting the number of steps the stepper motor is driven. Thus the varying potential is transduced into a resultant adjustment of the amount of rotation of the takeup reel 148 between indenting of individual characters on the surface of a card.

Figure 12:
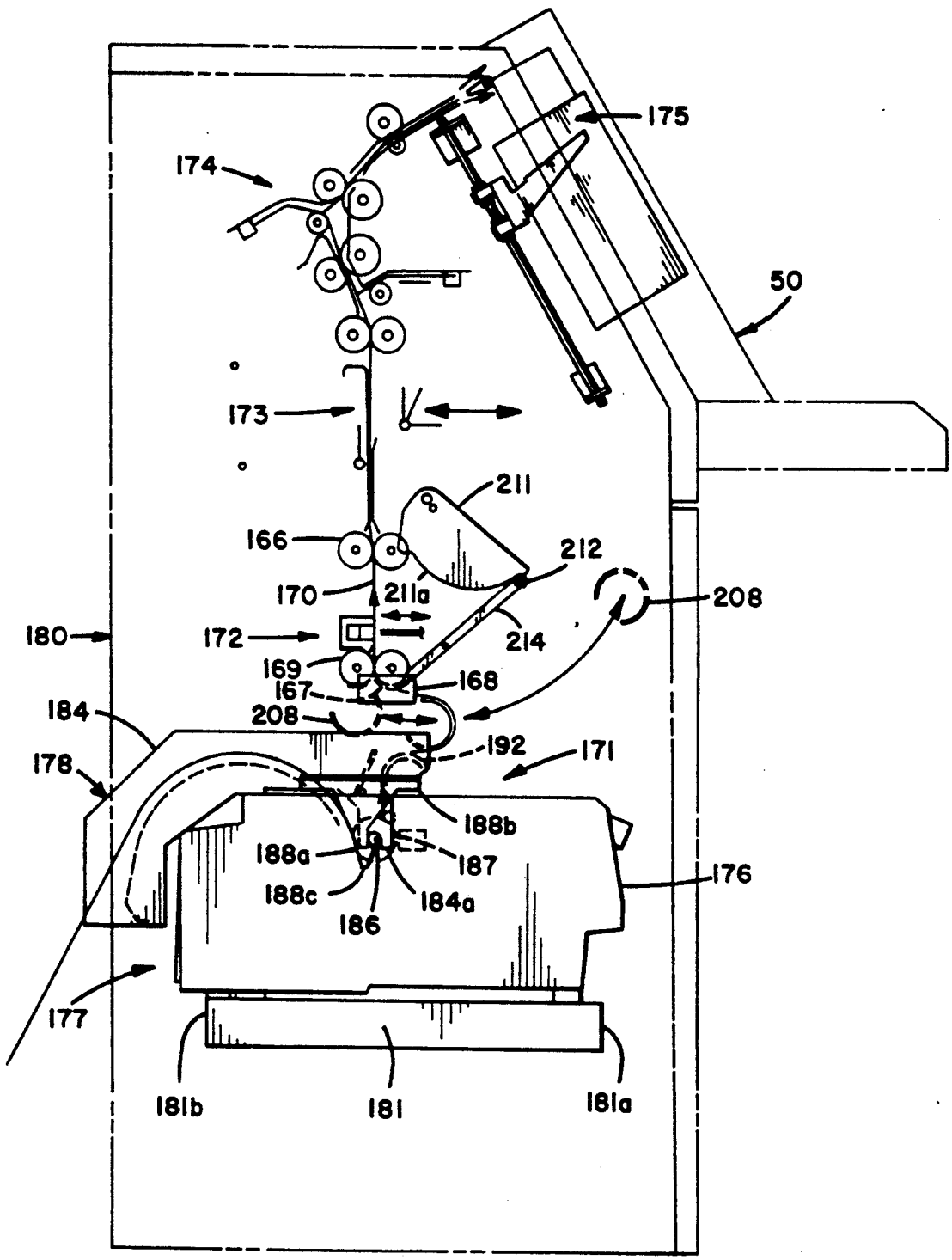
FIG. 12 is a side elevational view in cross-section, showing the path of the forms through the various stations of an inserter module of the card processing system shown in FIG. 1.

Referring to FIG. 12, an inserter module 50 is shown which includes a mechanism 171 for printing card holder specific information on a continuously fed, preprinted and perforated form 170; a mechanism 172 for separating, or "bursting" the forms 170 along the pre-existing perforations; a mechanism 173 for inserting a processed card, or cards, into pre-existing slots in the form 170 which has been printed with associated card holder information; a mechanism 174 for folding the form; and a mechanism 175 for collecting the folded and card-bearing forms or a mechanism for inserting the forms into envelopes (not shown). It may be appreciated that the general mechanism of each of the above-described operations, either singly or in combination with another, is previously known. In particular, reference may be made to U.S. Pat. No. 4,384,196 to McCumber et al., hereby incorporated by reference, which discloses an apparatus and system for preparing mailer forms and for inserting the cards to the respectively associated mailer form.

The inserter module 50 of the present invention is provided with structure such that it may be mated with any of the previously mentioned modular components.

Figure 13:
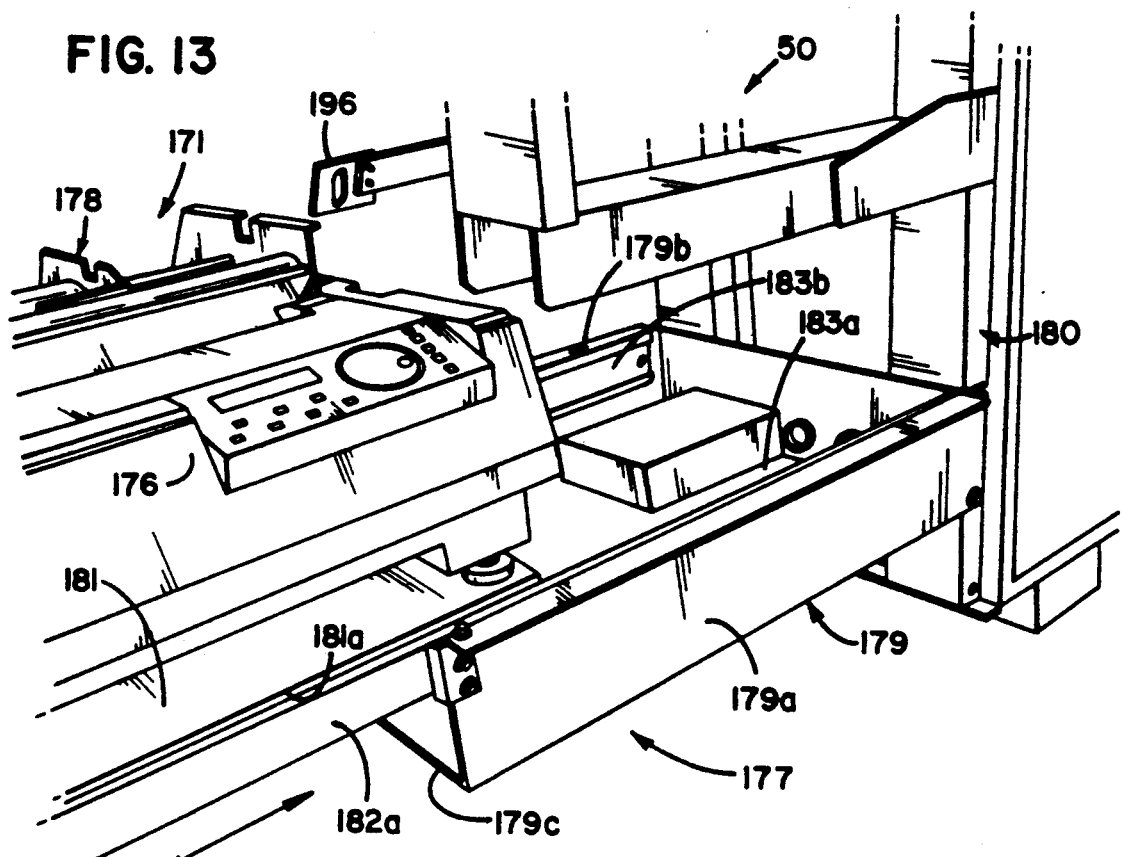
FIG. 13 is a perspective view of a fragmentary portion of the inserter module shown in FIG. 12 illustrating a printer and a printer carriage positioned outside the inserter chassis.

The inserter module 50 further includes structure which is readily adaptable for accepting a variety of printers 176 such as dot matrix, laser, thermal, ion deposition, etc., to suit the specific needs of a variety of printing tasks. The adaptable structure consists generally of a printer carriage 177 and a form guide 178. Referring to FIG. 13, a printer carriage 177 for supporting a printer 176 is shown. The printer carriage 177 consists of a printer carriage base 179 which is fixably mounted to the inserter module chassis 180 and is formed as a channel made up of front 179a, back 179b and bottom 179c sides, a support surface 181 on which the printer 176 is situated and which is sized to be slideably received in the printer carriage base 179, first 182a and second 182b rails which are mounted to the front 181a and back 181b sides, respectively, of the support surface 181, and third 183a and fourth 183b rails which are mounted to the upper inside surfaces of the front 179a and back 179b sides of the carriage base 179. First 182a and second 182b rails are slideably received by third 183a and fourth 183b rails, respectively, thus providing a structure for sliding the printer support surface 181 horizontally relative to the carriage base 179.

Upon removal of a portion of the inserter module's outside panels, access is gained to the printer carriage 177. The rails 182, 183 allow the support surface 181 to slide horizontally outward from a working position within the inserter module chassis 180 to the position as shown in FIG. 13 in which the rails 182, 183 have been fully extended. Once positioned outside the inserter module chassis 180, maintenance or replacement of the printer 176 may be accomplished.

Figure 14:
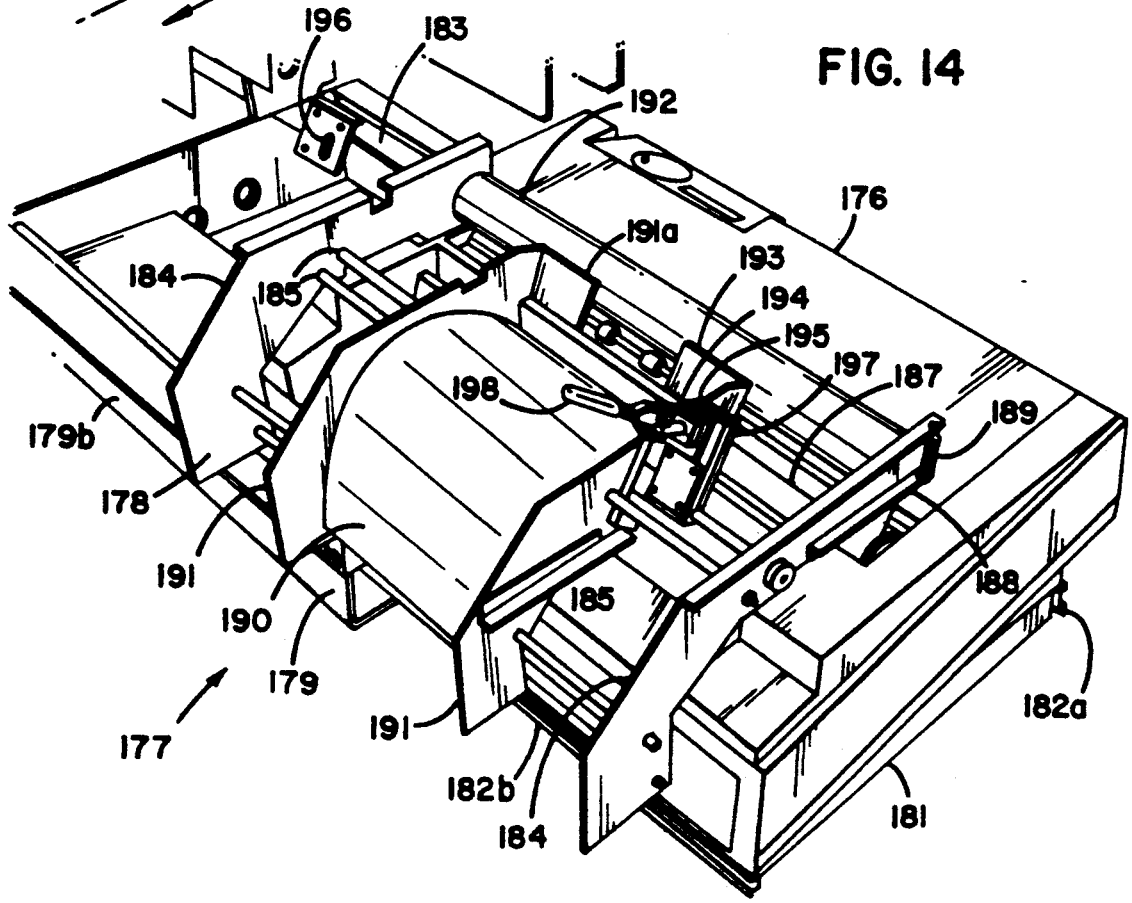
FIG. 14 is a rear perspective view of a form guide positioned above the printer of FIG. 13.

Referring now to FIG. 14, an apparatus 178 for guiding forms 170 into and out of the printer 176 is shown situated above the printer 176. Upon disengagement from the printer 176, the form guide 178 may be lifted away for easy access to the printer 176. Two outside brackets 184 form the left and right sides of the form guide 178, and are generally L-shaped to follow the contours of the top and back sides of the printer 176. Support elements 185 such as the rods illustrated in FIG. 14 are mounted between the outside brackets 184 to complete the framework for arranging the working components of the form guide 178 and to add rigidity to the structure. The support elements 185 are sized to position the outside brackets 184 over the exposed ends of the shaft 186 (shown in FIG. 12) which drives the printer's roller 187 or platen. The roller 187, in turn, drives the paper in the printer 176. As shown in FIG. 12, each outside bracket 184 is provided with an extension 184a, the end of which is slotted to engage the printer roller drive shaft 186. A lever 188 is pivotally mounted proximate the extension 184a, a first end 188a of which provided with a tooth 188c and a second end 188b is biased by a spring 189 (shown in FIG. 14) or the like, the spring 189 causing the tooth 188c at the first end 188a of the lever 188 to engage the underside of the printer roller drive shaft 186, thereby preventing the form guide 178 from becoming disengaged from the printer 176.

Referring again to FIG. 14, an arcuate guide surface 190 is provided in the form guide 178 for aligning continuous forms 170 as they are fed into the printer 176, the width of the arcuate guide surface 190 generally corresponding to the width of the forms 170 being printed. The arcuate guide surface 190 is supported between left and right paper edge guides 191, the paper edge guides 191 being mounted to the form guide 178 by the previously described support elements 185. The paper edge guides 191, as with the outside brackets 184, are generally L-shaped to follow the contours of the top and back sides of the printer 176. An end plate 193 is attached to each paper edge guide 191, and is angled to assist in deflecting upward the leading edge of the form 170 as it exits the printer 176.

As shown in FIG. 12, drive rollers 169 are used to drive the form sheets past the bursting mechanism 172 and to drive rollers 166 of the inserter. Adjacent the burster drive rollers 169 there is another set of paper edge guides 168 which guide the forms into proper alignment with the bursting mechanism 172 and the remaining mechanisms of the inserter. In addition there is an arcuate guide surface 167 for guiding the forms into the drive rollers 169 of the burster.

A cylindrical surface 192 is fixed between each of first ends of the outside brackets 184. As may be seen in FIG. 12, the cylindrical surface 192 contacts the forms 170 as they exit the printer 176 and provides a rounded surface against which the forms 170 may be deflected without causing the forms 170 to crease or tear.

As shown in FIG. 14, a device 194 is provided for positioning and locking the form guide 178 and printer carriage 177 in place upon sliding the carriage 177 into the inserter chassis 180. The locking device 194 is fixed to the form guide structure 178 as shown in FIG. 14. The locking device 194 includes a pin 195, the first end of which mates with a keyway 196 mounted to the inserter module chassis 180. The first end of the pin 195 is conically shaped to ensure centering and engagement with the keyway 196. The locking device 194 further comprises a guide block 197 through which the pin 195 slides, and a lever 198 which is mounted at a second end of the pin 195 for actuating the pin 195 between an engaged and a disengaged position.

Figure 15:
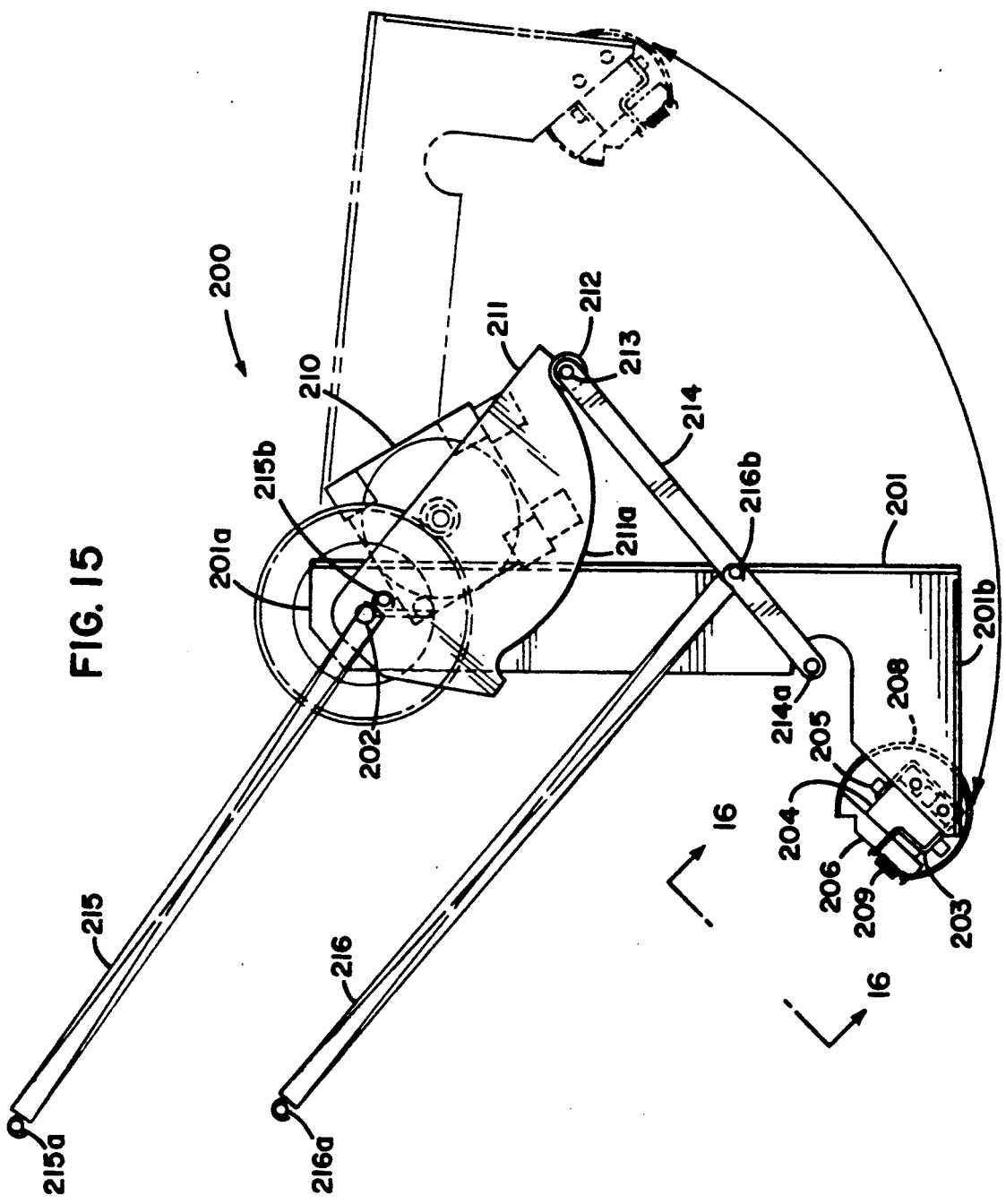
FIG. 15 is a side elevational view of a paper tensioner assembly of the inserter module shown in FIG. 12, removing from view the inserter module chassis structure.

As shown in FIG. 15, a paper takeup 200 is provided in the inserter module 50 for providing a paper accumulation capability between the printer head and the drive rollers of the bursting mechanism 172 and for maintaining the paper forms 170 in proper tension as they exit the printer 176 and proceed to the bursting mechanism 172. The paper accumulation capability facilitates asynchronous operation between the print head and the burster 172. In the preferred embodiment, there is between one and two form lengths of accumulation between the print head and the burster 172. This enables printing to begin at the top of a form since even right after the moment of bursting a form there is at least one form length between the print head and the burster 172.

As may be seen in FIG. 15, the structure of the takeup 200 begins with left and right side takeup arms 201. First ends 201a of the takeup arms 201 are mounted on either end of a shaft 202 supported horizontally by a suitable support structure in the inserter module chassis 180.

During the printing/bursting process, if the platen of the printer is not parallel with the burster drive rollers, the form paper will skew. If the takeup arms 201, or paper loop guide mechanism, is parallel with either roller, it will contact the skewed loop on one edge only, resulting in an increased tension along that edge and a tendency to tear the paper. The present invention, an embodiment of which is hereafter described, provides a loop guide mechanism which pivots about two axes so it can conform the loop to its natural state by compensating for the skew in the paper. Accordingly, the tension is taken up evenly all along the width of the paper.

Figure 16:
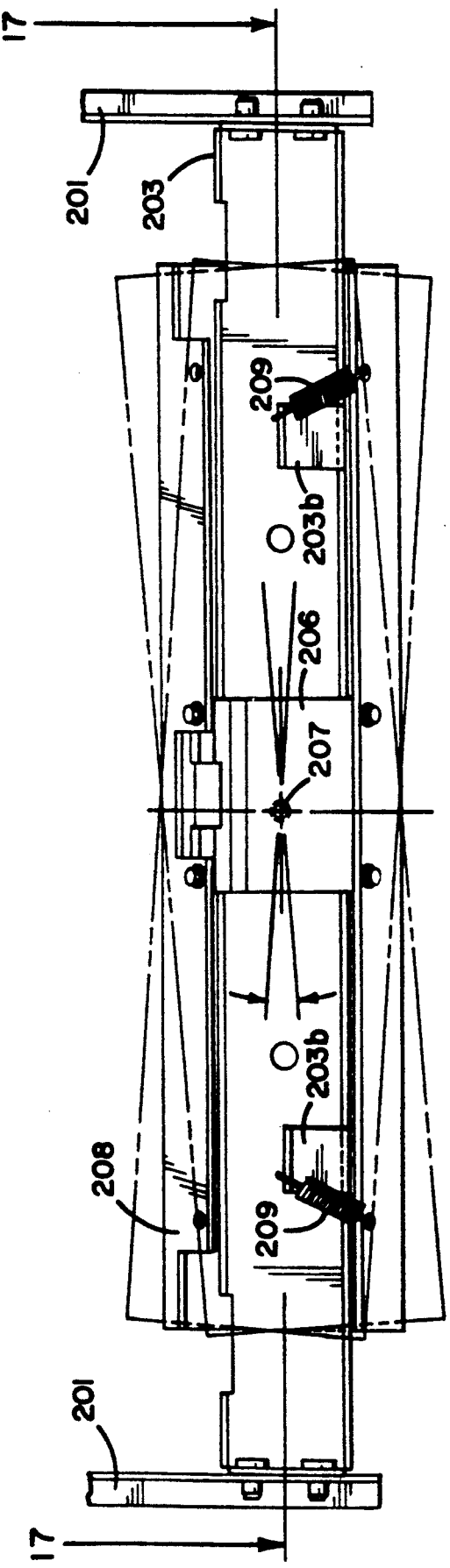
FIG. 16 is a side elevational view of a portion of the paper tensioner assembly taken generally along lines 16—16 of FIG. 15.
Figure 17:
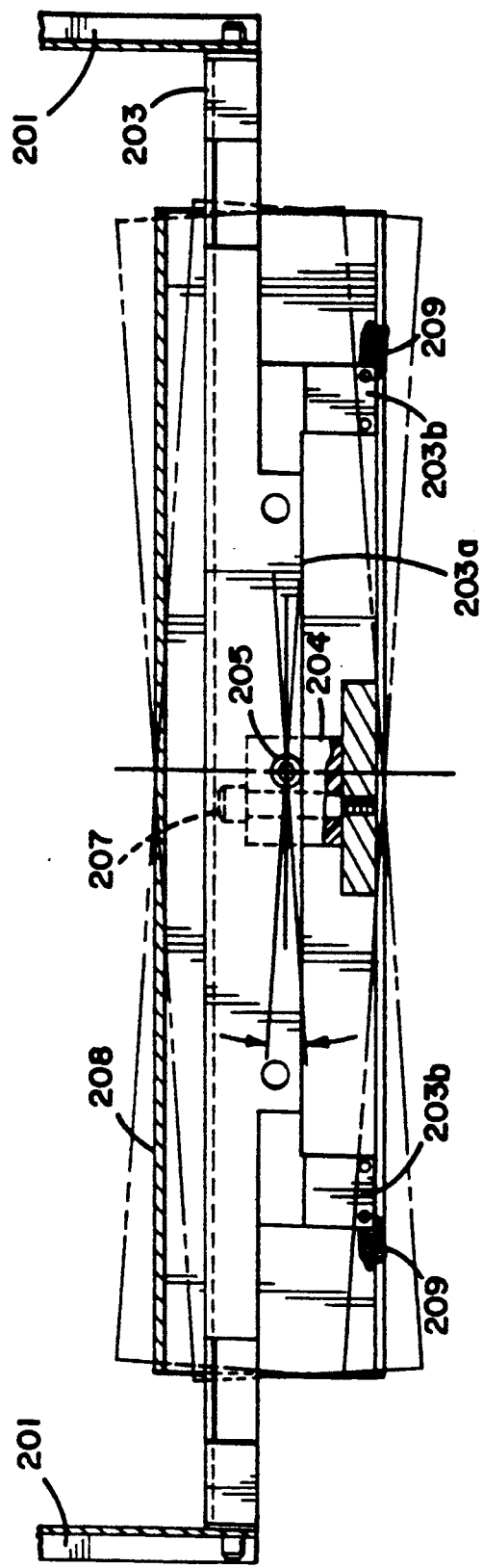
FIG. 17 is a cross-sectional view of a portion of the paper tensioner assembly taken generally along lines 17—17 of FIG. 16.

Referring to FIGS. 16 and 17, a transverse bracket 203 is mounted between the second ends 201b of the takeup arms 201. As best seen in FIG. 17, a flange 203a is formed perpendicularly to the major surface of the transverse bracket 203. The flange 203a includes an extension 203b on either end of the flange 203. A mounting block 204 is pivotally mounted with respect to an inside surface of the transverse bracket flange 203a by a first pin 205, the mounting block 204 being located midway between the ends of the transverse bracket 203. Referring again to FIG. 16, a mounting plate 206 is pivotally mounted and centrally located on an outwardly-facing surface of the mounting block 204 by a second pin 207. Affixed to the mounting plate 206 is a cylindrical surface 208 which encompasses a major longitudinal portion of the transverse bracket 203 without contacting the transverse bracket 203. The mounting block 204, mounting plate 206, cylindrical surface 208, and first 205 and second 207 pins cooperate to allow pivotal displacement of the cylindrical surface 208 generally in two axes generally about a location midway along the transverse bracket 203. Looking at FIG. 17 these axes include a first axis extending perpendicular to the plane in which the figure lies and a second axis extending parallel to a longitudinal axis of the transverse bracket 203.

As seen in FIG. 16, a biasing mechanism 209, such as a spring, is attached to each end of the cylindrical surface 208 and to each corresponding transverse bracket flange extension 203b. The biasing mechanism 209 biases the cylindrical surface 208 into an "at rest" position in which the axis of the cylindrical surface 208 is generally parallel to the axis of the transverse bracket 203.

Referring to FIG. 15, a drive motor 210 is shown in communication with the shaft 202 for selectively driving the shaft 202 during form loading and causing rotational displacement of the takeup arms 201. It will be appreciated that this might be accomplished in any number of ways. After loading the forms past the cylindrical surface 208 of the paper takeup 200 and retaining the forms in the drive rollers 169 of the bursting mechanism 172, the drive motor 210 is disengaged from the takeup arms 201 such that the cylindrical surface 208 is biased into the forms so as to place the forms under tension.

The biasing arrangement of the preferred embodiment of the paper takeup 200 compensates for the weight of the takeup 200 and exerts a variable biasing force against the takeup arms 201 biasing the takeup arms 201 about their pivot point 202 upward and away from the printer 176 toward the front of the inserter module 50 so as to create a substantially constant paper tension on the paper throughout the range of movement of the takeup arms 201 during paper accumulation. The biasing arrangement is illustrated in FIG. 15 as including a cam plate 211 which is mounted to one end of the shaft 202 and is provided with a cam surface 211a along one edge. A cam roller 212 contacts the cam surface 211a of the cam plate 211, the cam roller 212 being mounted to a shaft 213 on a first end of a roller pressure arm 214. The second end of the roller pressure arm 214 is pivotally mounted to the inserter module chassis 180 at a location 214a. A first spring 215 balances or compensates for the weight of the takeup arms 201 so as to neutralize their weight. One end of the first spring 215 is mounted to suitable support structure of the inserter module chassis 180 at 215a, the other end of the first spring 215 is mounted to a projection 215b on the cam plate 211.

A second spring 216 is provided for placing the paper under constant tension. The spring 216 biases the roller 212 into rotational contact with the cam surface 211a at the cam plate 211. As shown in FIG. 15, the spring 216 is mounted at one end to the inserter module chassis 180 at 216a, while the other end of the second spring 216 is mounted to a point along the roller pressure arm 214 at 216b, causing the pressure arm 214 and roller 212 to engage the cam surface 211a.

The above described springs 215 and 216 play a very important role since the takeup arms 201 will cause very high paper tension when the paper path is nearly straight and will cause much lower tension in the paper as the takeup arms pivot upward. High tension in the paper can result in the paper being torn. Thus it is important to vary the force exerted by the takeup arms such that the paper tension remains substantially constant throughout the range of movement of the takeup arms 201. The cam surface 211a in combination with the springs accomplishes this. The configuration of the cam surface 211b might be determined in part by recursively drawing the cylindrical surface 208 of the paper takeup 200 in its various positions throughout its range of motion. In one embodiment, the paper forms are placed under a tension of roughly ½ pound.

It will be appreciated that the specific spring strength and location will vary depending on the configuration of the paper takeup 200. In the embodiment shown the L-shaped takeup arms 201 are roughly 8¼ to 8½ inches long and have a base roughly 4½ inches long. The paper takeup has an overall weight of roughly one pound. The center of gravity of the paper takeup is roughly five (5) inches below the shaft 202 and one (1) inch in back of a vertical plane parallel to the shaft 202.

Electrical Description

The electrical connections between the system controller 43 and the modules of the present embodiment of the invention will now be described.

As stated previously, each card processing module will include a common AC power bus 70 for receiving AC power from a neighboring upstream module and passing AC power to a subsequent downstream module. Each module also includes a common serial communications bus 69 for carrying module commands and/or data. All operating power and control signals will be supplied by these two connections 69,70 which are made up of two separate cables.

AC power enters the card processing system 40 through the A.C. power input module 98 of the system controller 43. As described on previous pages, the A.C. power input module 98 is interchangeable to suit the voltage of the AC power source. In the discussion which follows, it is not necessary to state whether the power source is 110V or 220V, or therefore whether a 110V or 220V A.C. power input module 98 is in place within the system 40, as the basic circuitry will be the same in either case.

Figure 18A:
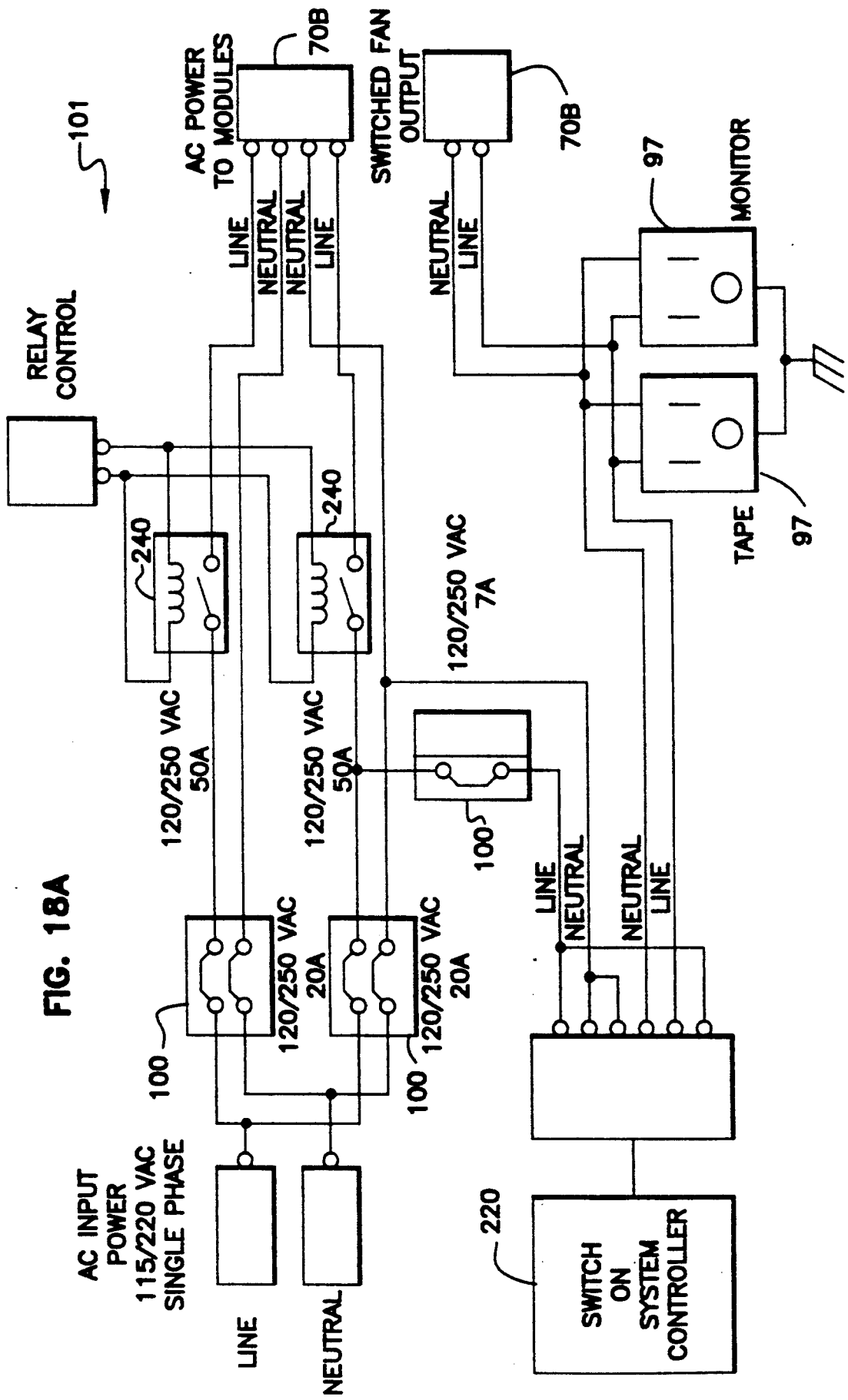
FIG. 18A is a schematic illustration of AC power interconnections to the system controller's AC power circuit board in one embodiment of the invention wherein the power input is 220 volts.
Figure 18B:
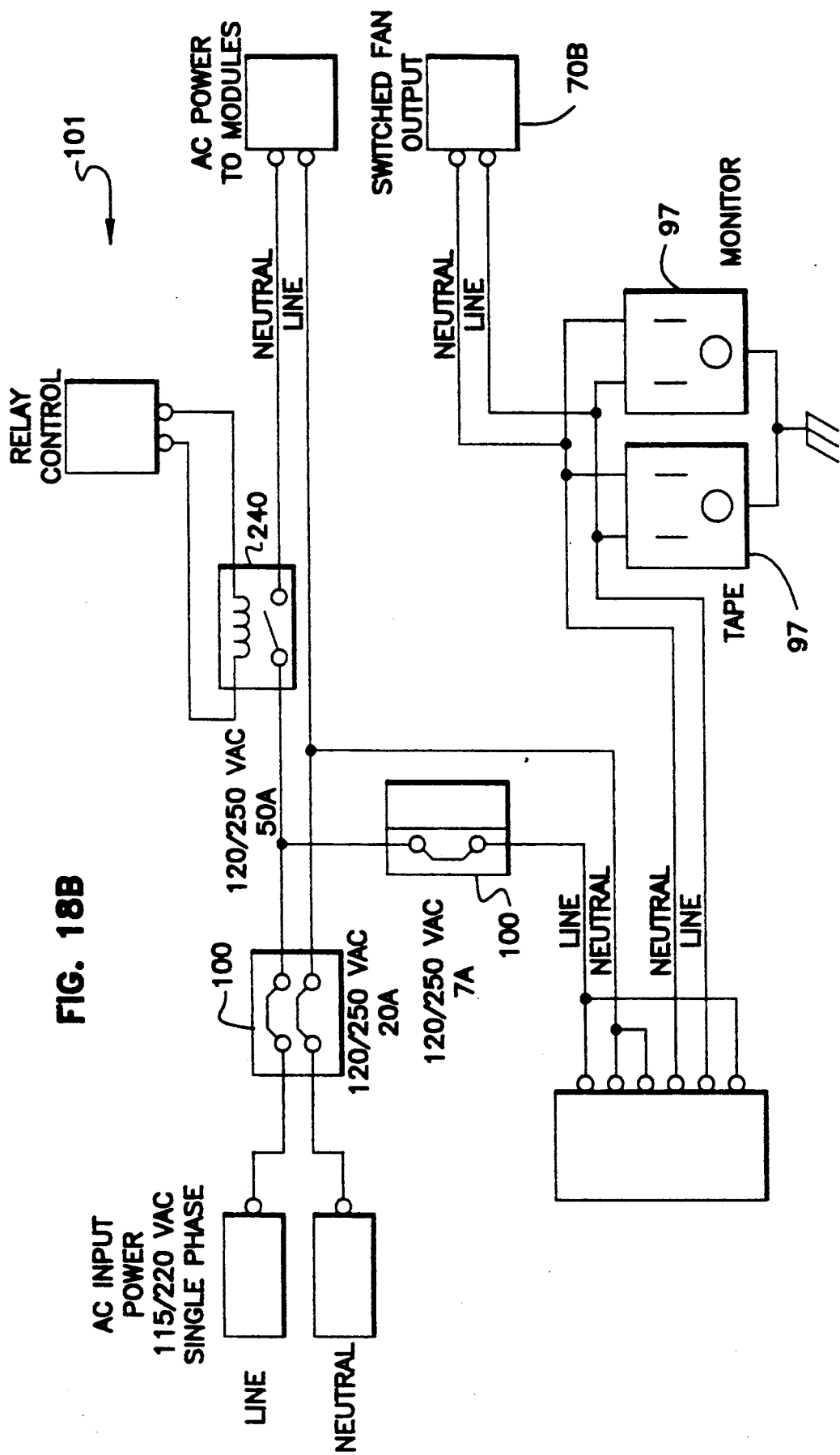
FIG. 18B is a schematic illustration of AC power interconnections to the system controller's AC power board in one embodiment of the invention wherein the power input is 115 volts.
Figure 19:
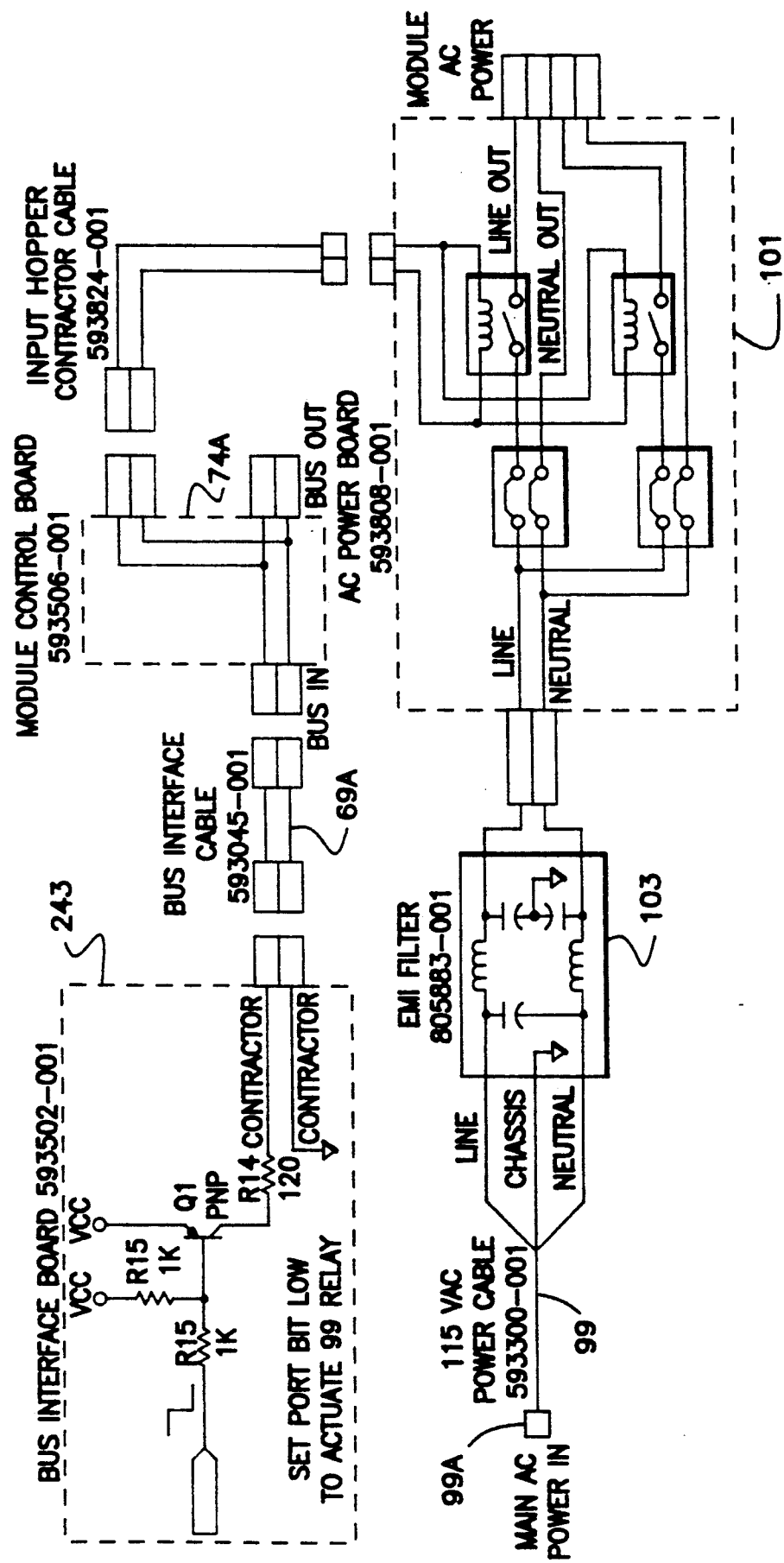
FIG. 19 is a schematic illustration of AC power distribution from the AC power circuit board of either FIG. 18A or FIG. 18B to the card processing modules.

FIGS. 18A,B are schematic representations of the system controller's AC power interconnections on the AC power circuit board 101 wherein in FIG. 18A the power input is 220 volts and wherein in FIG. 18B it is 115 volts. In the preferred embodiment, the board 101 has the same layout and is only populated with different components. As previously discussed, AC power is passed through an electro-magnetic interference (EMI) filter 103 and circuit breaker(s) 100 before branching into two separate circuits. One circuit, switched by a front panel switch 220 of the system controller 43, supplies A.C. power to the system controller power supply 78, system controller circuit board and system controller peripherals, i.e. fans 84, mass storage devices 51 such as disk drives, and monitor 41. The other circuit supplies power to the card processing modules through solid state relays 240 which 43. As illustrated in FIG. 19, commands to control the solid state relays 240 are sent down the serial bus via the input module's control board 74a and the Bus Interface Board 243.

Figure 20:
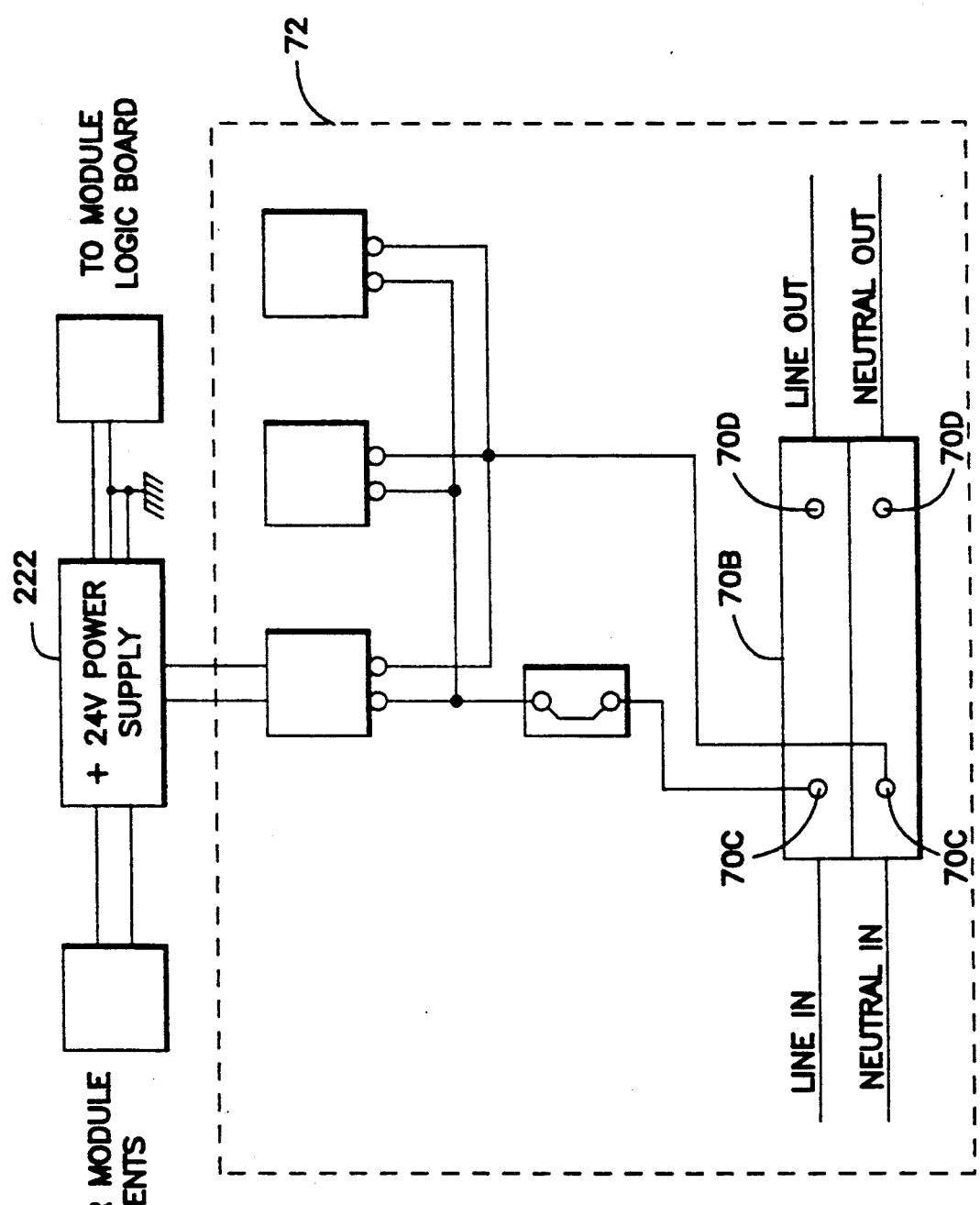
FIG. 20 is a schematic illustration of an embodiment of an AC distribution board at a module.

Referring to FIG. 20, each module has an AC distribution board 72, and each AC distribution board 72 is provided with a terminal block 70b which will serve as both an inlet 70c and an outlet 70d connection. The inlet 70c is a discrete 2 or 4-wire cable 70a that is connected to an upstream module, while the outlet 70d is a connection point for the 2 or 4-wire cable 70a to a downstream module. AC power passes between the module's inlet 70c and outlet 70d, and in addition, A.C. power is tapped off the inlet 70c to power the module's card processing mechanism. In one embodiment, the terminal block 70b has openings for insertion of the ends of the wires, the ends being stripped of insulator, and then a suitable clamp is threaded into place to provide electrical contact between the wires and the terminal block input and outlet.

As may be seen in FIG. 20, AC power from the system controller 43 is fed to the first module, which is the Input Hopper 44 in this embodiment, through the AC inlet 70c at the module's AC distribution board 72. AC power is converted to DC power by a power supply 222 present in each module and is distributed to the module's various components including the module's logic board. In certain modules, there will be other components that require AC power such as solenoid control, topper heaters, printers, etc. This AC power can be derived from the AC distribution board 72.

AC power passes through the module's outlet 70d at the AC distribution board 72 and travels down the AC power bus 70 to the inlet 70c at the next module's AC distribution board 72, where AC power is supplied to the module's components as well as passing through the outlet 70d to the next module. This series continues until each of the individual modules are similarly and sequentially linked together.

Figure 21:
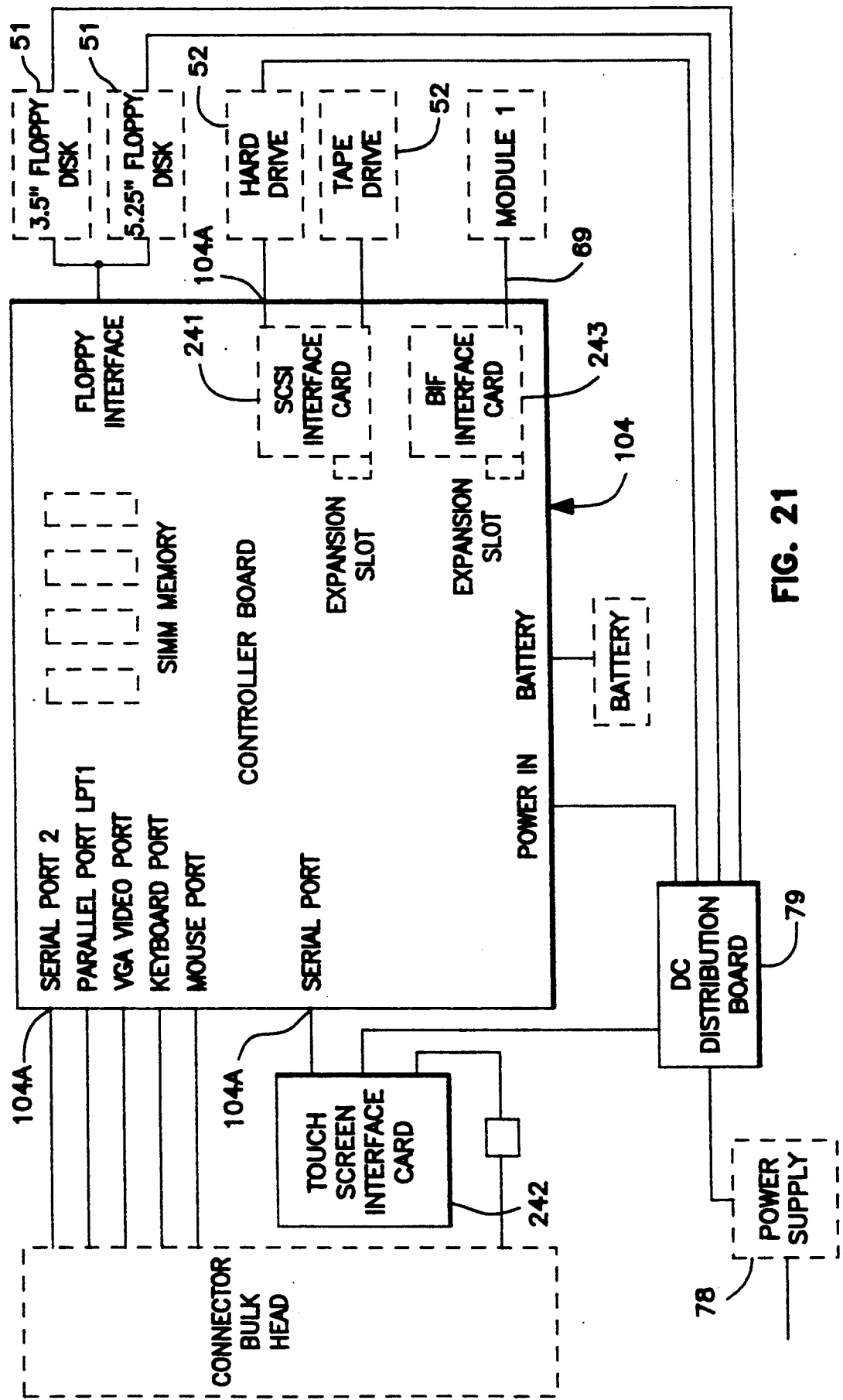
FIG. 21 is a schematic illustration of a system controller circuit board present in one embodiment of the invention.

Control signals sent to the card processing modules originate at the system controller's main controller circuit board 104. FIG. 21 is a schematic representation of the interconnections to the system controller main circuit board 104. A.C. power, converted to DC power within the controller, is supplied to the system controller DC distribution board 79 and, subsequently, to the main controller board 104 and peripherals such as the floppy disk drive 51 and hard disk drives 52. The main controller board 104 processes card data supplied by magnetic tape, disk or operator input, as well as communicating with the modules. Ports 104a are therefore provided with the main controller board 104 for connecting disk drives 51, 52, manual input devices such as the keyboard 42, and the serial communications bus 69 to the modules. A SCSI interface card 241 for the hard disk, tape drive and other storage devices, a touch screen interface card 242 for the display, and a serial communication bus interface (BIF) card 243 for communication with the modules are all provided as circuit cards 105. Additional circuit cards might be added such as a network adaptor card, Kanji character board, Japanese video board, etc.

The control signals passed between the modules and the system controller 43 will be sent through the serial communications bus 69 which includes a 16-pin cable 69a. The control signals carried by the 16-pin cable are, more specifically, communication information, interlock power, and module initialization signals. Like the AC power cable 70a, this cable 69a will attach to a module through inlet 69b and outlet 69c connectors which are located at the module's control board 74.

All control signals will be differentially driven or electrically isolated to minimize the effect of ground differences within the system. There are three control circuits bussed through the system, which are 1) SDLC data channel
2) Interlock power
3) Auto-Initialization The SDLC data channel is a half duplex communication interface which exchanges both data and control information between the controller and the modules. The SDLC signals occupy two of the 16 signals on the control channel. This signal pair is bi-directional.

System interlocking is performed by a control circuit originating at the input hopper module. It will be used to drive the interlock relay on every module control board. At the module, the interlock relay coil will be electrically isolated from the module's power source and can only be activated by the power received from this signal pair on the cable. Bussed interlock power will be limited to 2 amps to prevent any undesirable effects should the cable ever short. At the input hopper module, an interlock switch will be used to activate the interlock power on the bus.

The auto-initialization feature is used to automate and simplify the system configuration utility, the function of which is described in more detail in the following section. The initialization process uses three pairs of signals on the cable. Two of these signals make up a control circuit which is threaded from the controller through each module and back. The third signal is a loopback jumper which is used to detect the end of the system. This jumper does two things: first, it will automatically terminate (adding a resistive load) all differentially driven signals on the cable. Second, it reflects the initialization signals from the end module back to the controller. This loopback connection will be made through the cable and a shorting connection from the downstream module. When a downstream module is there, the short is made and the termination is removed. In the absence of a downstream module, the loopback connection is broken and the termination is applied.

Figure 22:
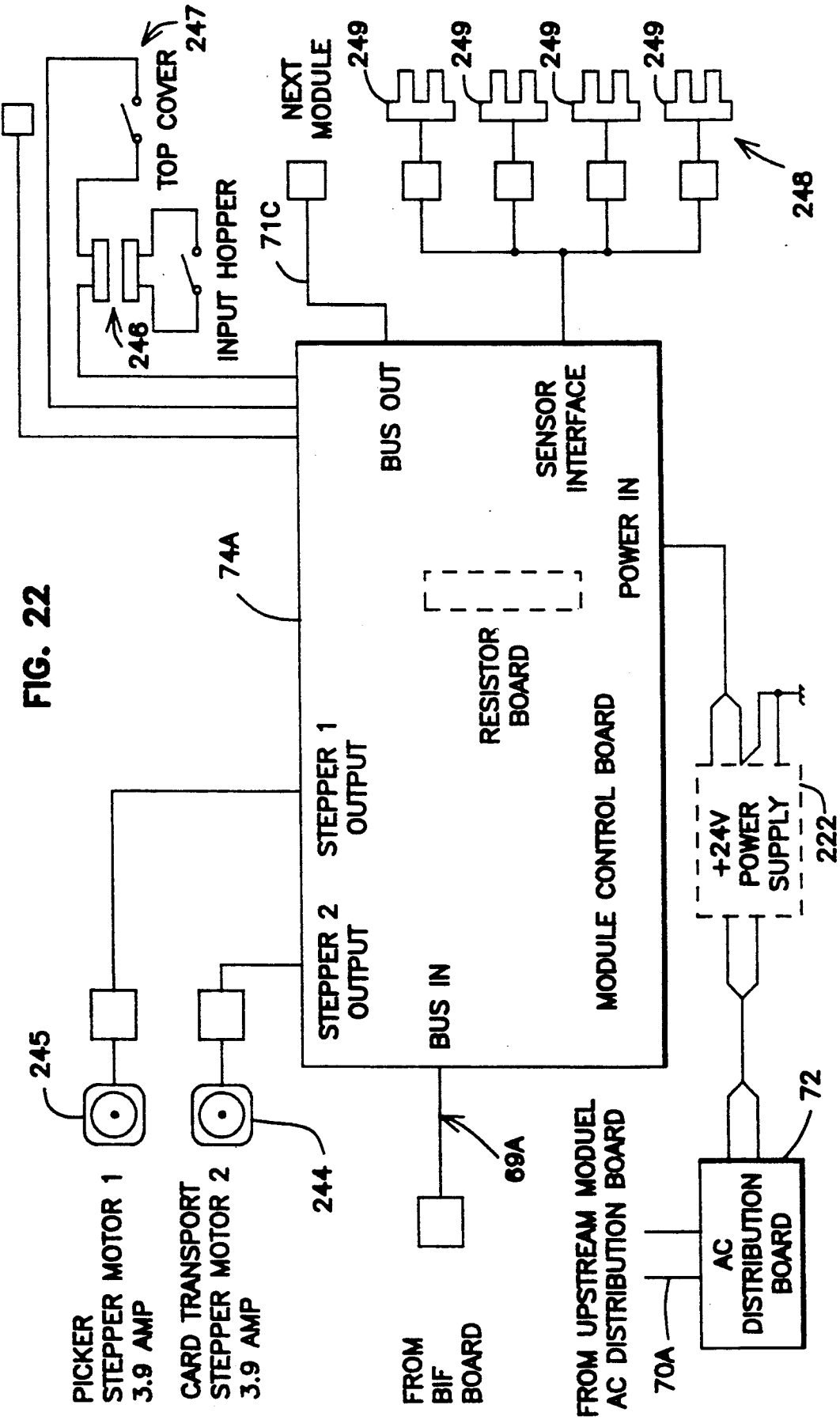
FIG. 22 is a schematic illustration of a module control circuit board present in one embodiment of an input hopper module.

As seen in FIG. 22, which is a schematic representation of the circuit interconnections in the Input Hopper module 44, AC power from the AC power board 101 in the system controller 43 enters the module's AC power distribution board 72 via the 4-wire cable 70a. Converted to 24V DC power, the power is supplied to the Input Hopper module control circuit board 74a. The Input Hopper control board 74a is provided with various ports for connecting to a card transport stepper motor 244, a card picker stepper motor 245, an input hopper interlock switch 246 and top cover interlock switch 247. A sensor interface 248 is provided for enabling communication with various sensors 249 for detecting card processing conditions such as the number of cards in the input stack, card interstage, picking arm position, and card exit. The Input Hopper control board 74a shown in FIG. 21 is provided with an inlet 69b for connecting to the 16-pin cable 69a from the bus interface card (BIF) 243 of the main controller board 104. The module's control board 74a is also provided with an outlet 71c for connection via the 16-pin cable 71a to the next downstream module.

Figure 23:
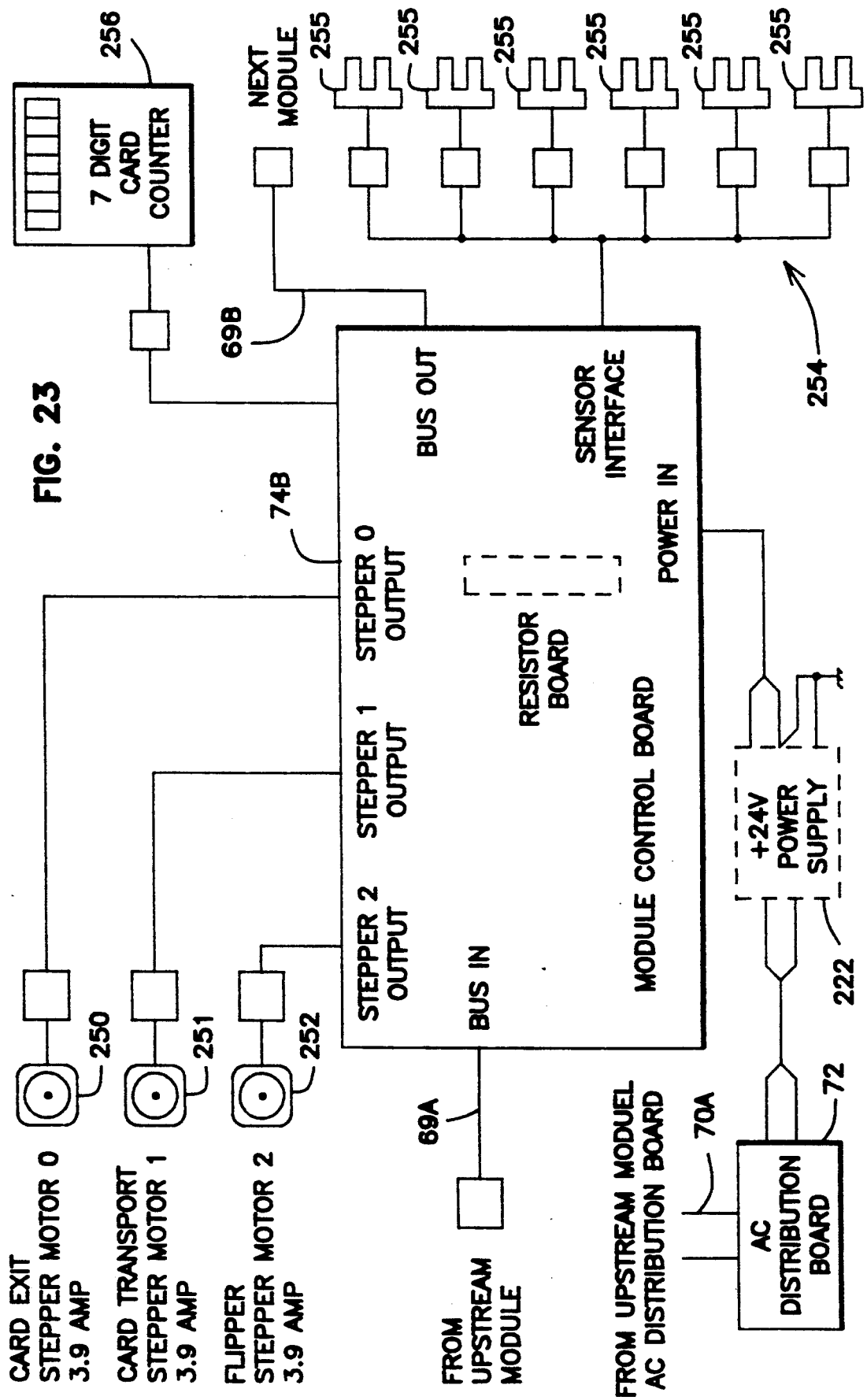
FIG. 23 is a schematic illustration of a module control circuit board present in one embodiment of an output hopper module.

FIG. 23 is a schematic representation of the circuit interconnections within the Output Hopper module 49. AC power from an upstream module's AC distribution board 72 enters the Output Hopper module's AC power distribution board 72 via the 4-wire cable 70a of the AC power bus 70. As with previous modules, the AC power is converted to 24V DC power which in turn is supplied to the Output Hopper module control board 74b. The Output Hopper module control board 74b is provided with various ports for connecting to a card exit stepper motor 250, a card transport stepper motor 251, a flipper stepper motor 252, and a 7-digit card counter 256. A sensor interface 254 is provided for enabling communication with various sensors 255 for detecting card processing conditions such card entrance, card exit, card interstage, flipper home, stack full, and reject full. The Output Hopper control board 74b shown in FIG. 23 is provided with an inlet 69a for connecting to the 16-pin cable 71a from an upstream module's control board 74. As with the Input Hopper control board 74a, the Output Hopper control board 74b is also provided with an outlet 69b connection via the 16-pin cable 71a to the next downstream module. In addition, the control board 74b is shown interfacing with a counter for counting the cards processed.

The foregoing descriptions of the circuit interconnections within the Input Hopper 44 and Output Hopper 49 modules are representative examples of the basic circuitry in any of the card processing system's modules. The general relationship between the module control board 74, power supply bus 70, and serial communications bus 69 is repeated in every module comprising the embodiment of the card processing system disclosed herein. However, the module control boards 74 might be populated with any number of circuits for interfacing with any number of electro/mechanical devices.

Software Description

Operational control of an embodiment of the present invention will now be described. The following abbreviations, acronyms and definitions are used:

| Abbreviations | |
|---|---|
| BIF | Bus Interface |
| CF | Card Format |
| CSM | Card System Manager |
| CSMIF | Card System Manager Interface |
| CTP | Card To Process |
| DC | Device Configuration |
| DDD | Device Dependant Data |
| DF | Device Formatter |
| DIT | Data Input Thread |
| FIR | File Identification Record |
| IDC | Input Device Configuration |
| IDF | Input Data Format |
| IPC | Inter Process Communication |
| MCT | Module Control Thread |
| PCT | Production Control Thread |
| SDLC | Synchronous Data Link Control |
| UIF | User Interface |

GLOSSARY

Bus Interface (BIF)
Physical and logical components used to send and receive information to and from modules on a common data bus.

Card Format (CF)
Information used with the Input Data Format (IDF) to convert Record Data to CardScript. This includes manipulating and transforming Record Data.

Card Record
The combination of Record Data and Record Status.

CardScript
A general purpose language that describes a card independent of the system that will actually produce the card.

Card System Manager Interface (CSMIF)
A process that serves as the connection between the system and a Card System Manager.

Card To Process (CTP) Notification
The event that occurs when the upstream module has a card that it wishes to transfer.

Device Configuration (DC)
Describes what a device's physical capabilities and characteristics are and identifies the pertinent information used by the device in CardScript.

Device Dependant Data (DDD)
Data for a card that has been formatted for specific devices. Devices may include the run-time data display, card preview, physical modules, audit trail, journals, etc.

Device Formatter (DF)
Performs device specific transformation from CardScript to Device Dependant Data, using CardScript and Device Configuration as inputs.

Empty Notification
The event that occurs when the downstream module may receive a card.

Field
A portion of a Card Record.

Field Name
The name given to a Field.

Field Identification Record (FIR)
A record in the input data stream that contains production information used to indicate how cards are to be produced.

Input Data
The original data received from the input devices.

Input Data Format (IDF)

The IDF delimits and names portions of the Input Data and is used to transform Input Data into Record Data.

Message

A means of passing information between independent concurrent processes.

Module Control Thread

A process within Production Control that is responsible for the operations of a specific module.

Module

A combined hardware/software system for performing a single card processing task.

Pop

The operation of removing an element from the end of a queue.

Production Control Thread (PCT)

The process in the controller that controls module operations.

Pull

The operation of removing an element from the front of a queue.

Push

The operation of adding an element to the end of a queue.

Put

The operation of adding an element to the front of a queue.

Record Data

The card data from the Input Data.

Record Status

All additional information added to the Input Data by the system.

Thread

A point of execution within a process.

DESCRIPTION

The logic control of the present invention consists of a number of concurrent processes that run independently of each other on a multi-tasking operating system such as OS/2 or Unix on a general purpose personal computer. Processes have the ability to communicate with other running processes by sending and receiving messages.

Logic Control System

Figure 24:
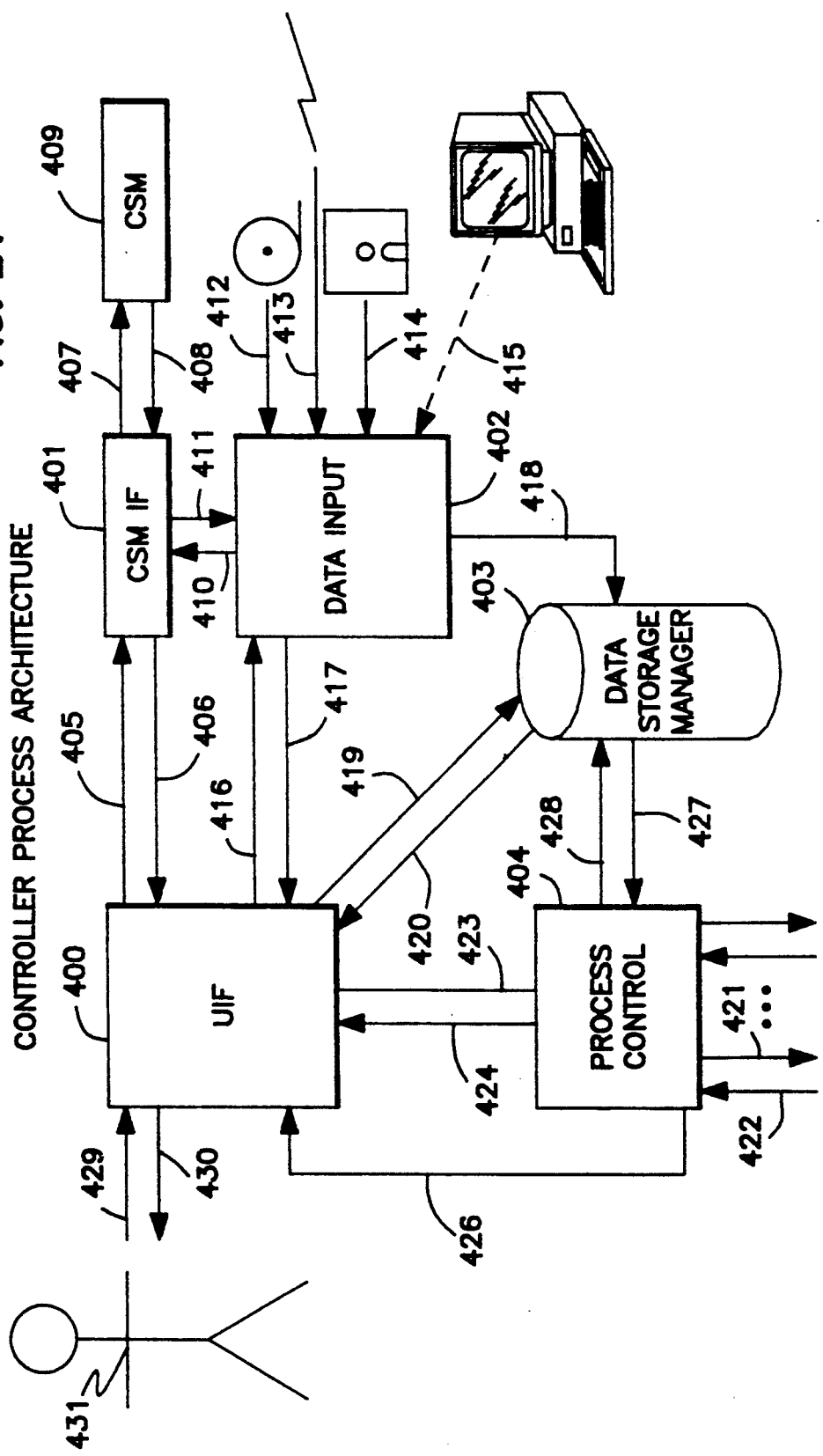
FIG. 24 is a block diagram showing the high-level architecture of the logic control system.

As illustrated in FIG. 24, the logic control system includes five separate high-level components:

1. User Interface (UIF) process 400. The UIF process 400 receives input 429 from and displays information 430 to a user 431, interacts with and maintains control over all other high-level components, and provides the following:
   a. Card data utilities;
   b. Editing of remake list.
   c. Editing of system options and configuration;
   d. Job scheduling;
   e. Operator interface;
   f. Prevention of unauthorized use;
   g. System diagnostics;
   h. System usage reports;
2. Card System Manager Interface (CSMIF) process 401, which provides a network interface and supplies routing information. The CSMIF process 401 receives record updates, status, and inquires 405 from the UIF process 400, and sends schedule, operations, and request for information messages 406 to the UIF process 400. In addition, the CSMIF process 401 receives information 408 from and sends information 407 to the Card System Manager 409.

3. Data input thread (DIT) 402, which provides device interface and data conversion. The DIT 402 receives input data and card records 411 from and sends status 410 to the CSMIF process 401. The DIT 402 also receives FIR and data from devices such as tape 412, network 413, disk 414, or system console 415 sources. The DIT 402 interacts with the UIF 400 by receiving requests for data, IDF, and recovery instructions 416 and by sending status messages 417.

4. Data storage manager (DSM) 403, which contains card data, configurations, fonts, logs, and other database information. The DSM 403 receives card data and file records 418 from the DIT 402, and receives information 419 from and provides information 420 to the UIF 400.

5. Production Control Thread (PCT) 404, which controls card production and provides an interface 421, 422 to physical modules. The PCT 404 receives control requests 423 and diagnostic requests from and sends system data 424 and diagnostic data to the UIF 400. In addition, the PCT 404 sends updated card data records 428 to and receives card data records, card formats, and device configurations from the DSM 403.

10 Data Input Thread (DIT)

Figure 25:
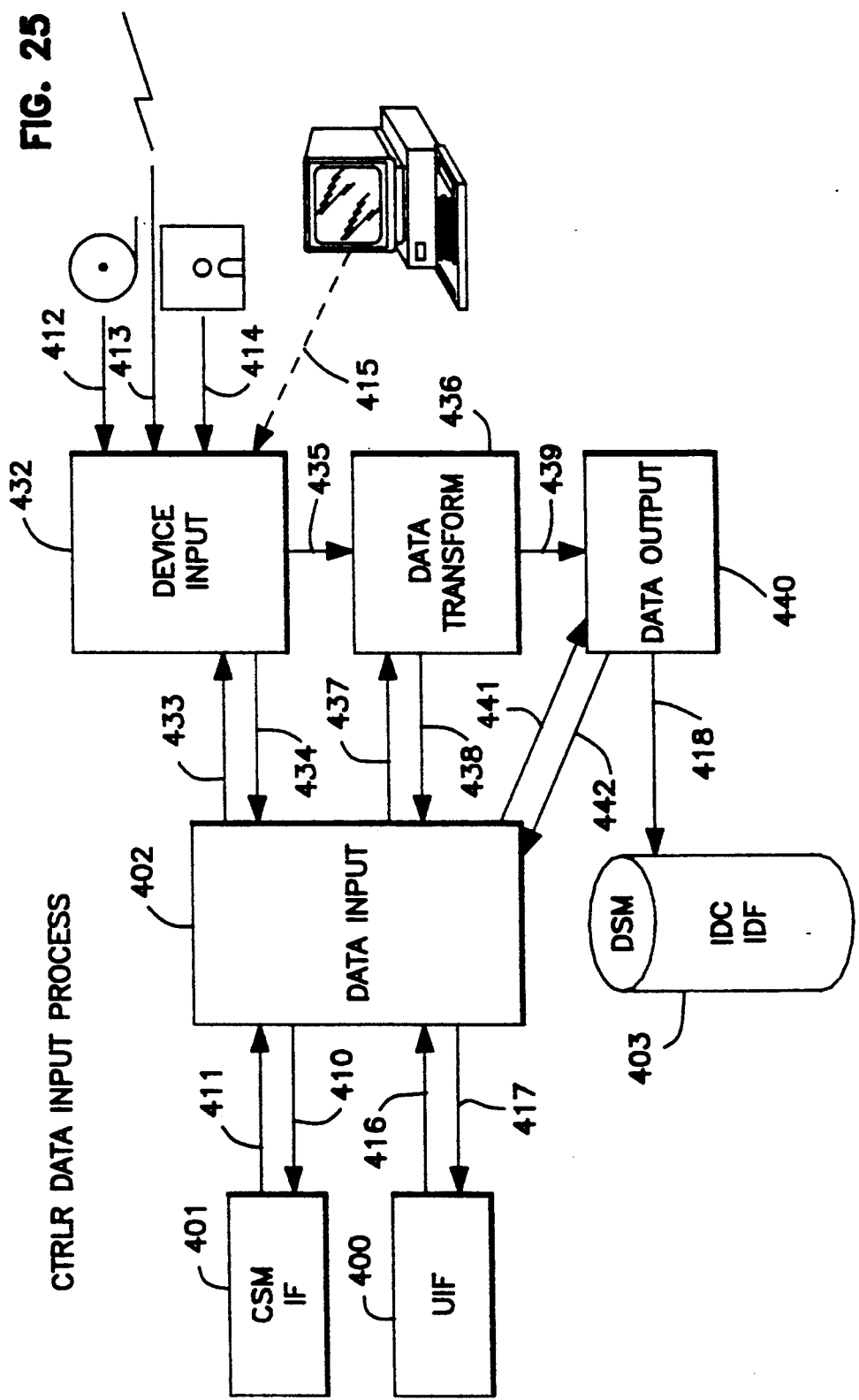
FIG. 25 is a block diagram showing the data input process.

As shown in FIG. 25, the DIT 402 acts as the main thread for data input, and is responsible for creating and controlling threads for three subprocesses for each input device, monitoring activities within the threads, and interfacing to the UIF 400.

1. The device input thread 432 receives data requests 433 from and sends status and error information 434 to the DIT 402. The device input thread 432 uses an IDC to read data from input devices such as tape 412, network 413, disk 414, or system console 415.

2. The data transformation thread 436 receives data requests 437 from and sends status and error information 438 to the DIT 402. The data transformation thread 436 uses the FIR and IDF to filter data 435 from the device input thread 432, performs any data format conversions necessary, and parses the data into fields.

3. The data output thread 440 receives data requests 441 from and sends status and error information 442 to the DIT 402. The data output thread 440 receives converted records 439 from the data transformation thread 436, and writes file, schedule entries, and customer database entries 418 to the DSM 403.

Production Control Thread (PCT)

Figure 26:
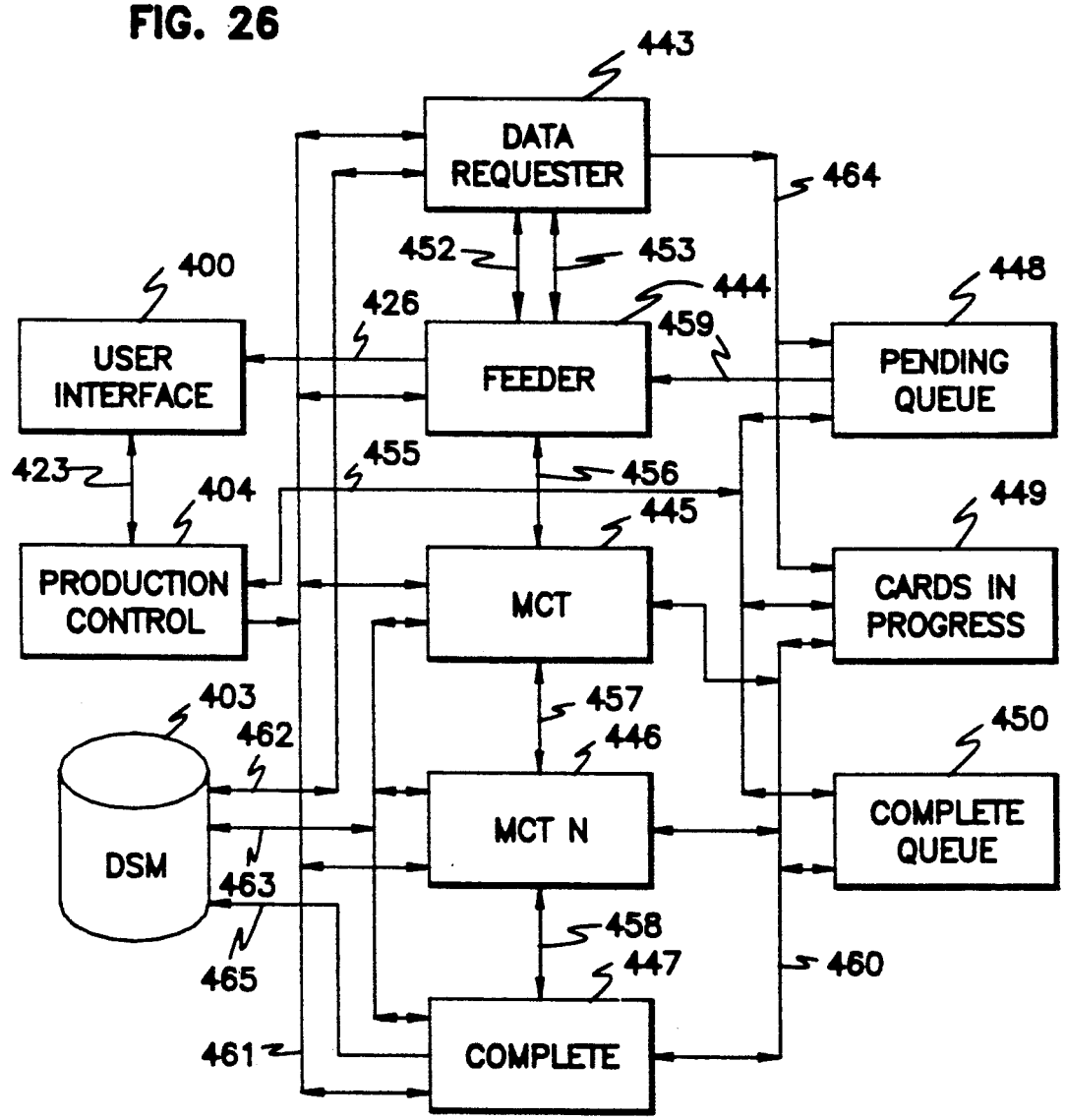
FIG. 26 is a block diagram showing the production control process.

As revealed in FIG. 26, the production control thread (PCT) 404 acts as the main thread for production control, and is responsible for creating and controlling threads for four subprocesses, monitoring activities within the threads, establishing inter process communication (IPC), supervising error recovery, and interfacing to the UIF 400. In order to improve system throughput, the PCT 400 has the highest priority except for time critical card processing threads in a module.

1. The data requester thread 443 is responsible for keeping pending queue 448 full, and receives commands from and sends status and error information 461 to the PCT 404. The data requester thread 443 creates an instance of a card, requests and receives data 462 for the card from the DSM 403, then pushes the card 464 onto the cards pending queue 448 and cards in progress queue 449. The data requester thread 443 receives the following messages from the PCT 404:

a. Finish: do not produce any more cards from the current production unit;
b. Start: start processing a new production unit;
c. Terminate: free resources and end the process thread.

The data requester thread 443 sends the following messages to the PCT 404:

a. Error: currently have an error;
b. Production unit aborted: current production unit has been aborted due to a PCT request;
c. Production unit done: all data for the current production unit is exhausted.

2. The feeder thread 444 receives commands from and sends status and error information 461 to the PCT 404, receives commands from and sends status and error information 453 to the data requester 443, and sends and receives card status 452 from the data requester 443. The feeder thread 444 pulls a card 459 from the cards pending queue 448, waits for it to be requested by the MCT 445, then sends monitor data 426 to the UIF 400.

3. There is a module control thread (MCT) for each card processing module and can vary from 1 to N in number. A MCT 445, 446 receives commands from and sends status and error information 461 to the PCT 404. The MCT 445, 446 sends and receives a card status 456, 457 from adjacent modules, sends module specific functions to the physical modules in order to correctly produce the card, then pushes the card 460 onto the cards in progress queue 449. When cards 460 are completed in the MCT 445, 446, they are removed from the card in progress queue 449 and placed in the complete queue 450. The MCT 445, 446 sends and receives configuration information 463 from the DSM 403. The MCT 445, 446 receives the following messages from the PCT 404:

a. Abort: abort current activity;
b. Module specific: perform the given module specific command;
c. Notify idle on: notify the PCT whenever idle or busy;
d. Notify idle off: do not notify the PCT whenever idle or busy;
e. Pause: pause after the next card cycle;
f. Resume: resume performing card cycles after a previously issued Pause message;
g. Start: start performing card cycles after a previously issued Stop message;
h. Stop: stop performing card cycles immediately;
i. Terminate: free resources and end the process thread.

The MCT 445, 446 sends the following messages to the PCT 404:

a. Busy: currently processing a card cycle;
b. Error: currently have an error;
c. Idle: currently not processing any cards;
d. Paused: card cycle processing is suspended in response to a PCT request to pause;
e. Startup complete: process thread and module have completed initial power up.

4. The complete thread 447 pulls cards 460 from the complete queue 450, sends card audit information 465 to the DSM 403, performs post production processing of cards, receives commands and sends status and error information to the PCT 404, and sends and receives card status 458 from the MCT N 446. The complete thread 447 sends and receives configuration information 463 from the DSM 403. The complete thread 447 receives the following messages from the PCT 404:

a. Notify idle on: notify the PCT whenever idle or busy;
b. Notify idle off: do not notify the PCT whenever idle or busy;
c. Terminate: free resources and end the process thread.

The complete thread 447 sends the following messages to the PCT 404:

a. Busy: currently processing a card cycle;
b. Error: currently have an error;
c. Idle: currently not processing any cards;

Production Physical Components

Figure 27:
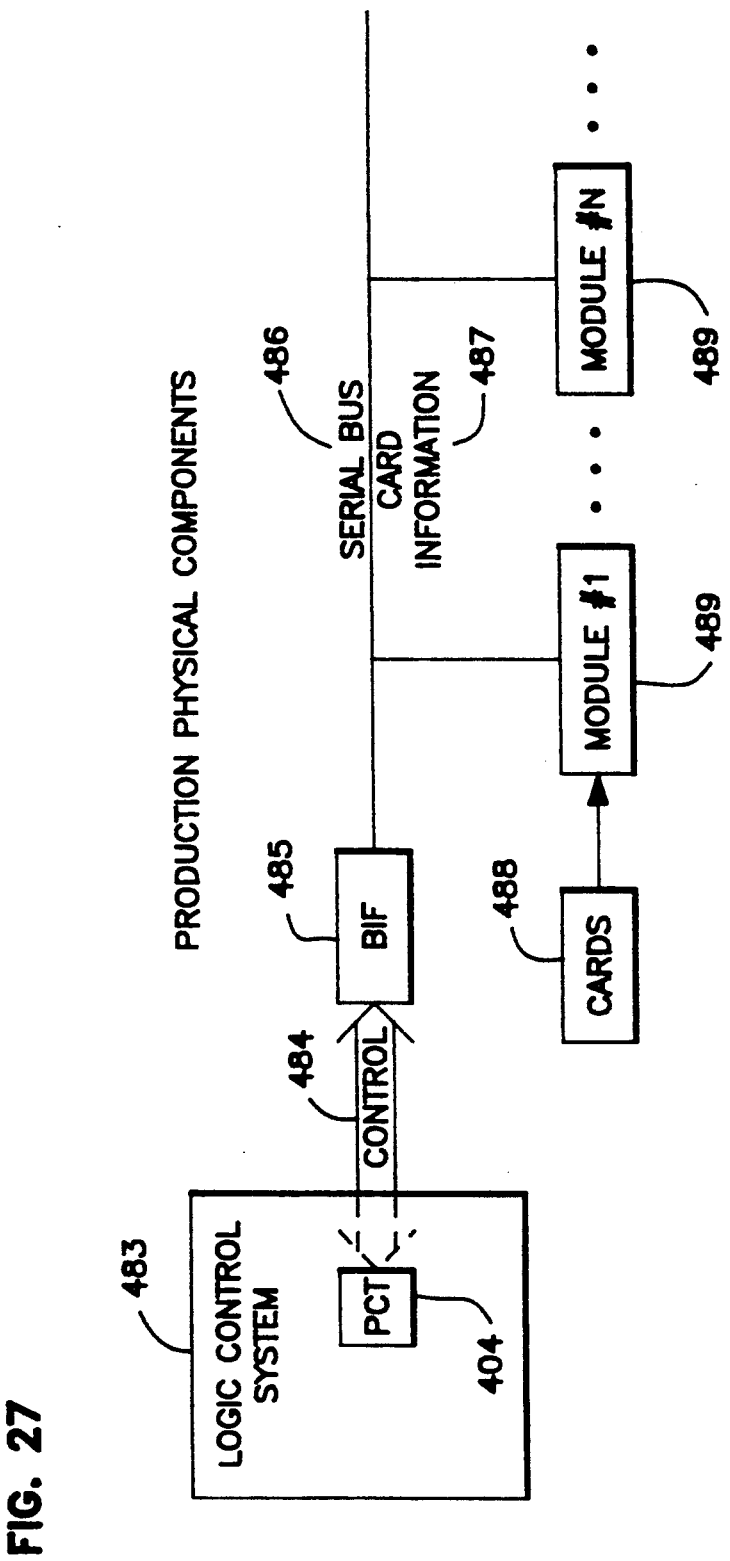
FIG. 27 is a block diagram showing the network topology of the logic control system.

As illustrated in FIG. 27, the production physical components consist of:

1. The PCT 404, which resides in the logic control system 483 as a number of concurrent processes that run independently of each other on a general purpose personal computer. The PCT 404 acts as the primary station when communicating with the production modules through a device-driver control 484 to a bus interface (BIF) 485.

2. The BIF 485, which provides the physical and logical connection in order to pass card information 487 along the bus between the PCT 404 and card processing modules 489.

3. A distributed set of intelligent card processing modules 489, connected with both an electrical serial communication bus 486 and a mechanical card transport bus 488.

Data Security

The two elements of data security in this system concern accurately matching information to a card. The two types of accuracy issues are 1) data validity (numerical accuracy), where the information that is supposed to be on a particular card is actually on that particular card, and 2) data integrity (numerical precision), where the data that is instructed to put placed on a card is placed on that card without errors. Maintaining data validity requires cooperative action between the operator and the system, while maintaining data integrity is the sole responsibility of the system. The nine levels where steps are taken to insure data validity and data integrity are given below.

1. Data transfer from a peripheral to system hard disk (no missing or duplicate records). Data integrity is maintained by formal communication protocols and error detection/correction means implemented in hardware. Data validity is maintained by a user supplied CRC/checksum created during preparation of the data, a sequence number check, and a corresponding system generated CRC/checksum for detecting modified data.

2. Data transfer from a peripheral to system hard disk (no data errors). Data integrity is maintained by formal communication protocols and error detection/correction means implemented in hardware. Data validity is maintained by a user supplied CRC/checksum created during preparation of the data, a sequence number check, and a corresponding system generated CRC/checksum for detecting modified data.

3. Data transfer from system hard disk to memory. Data integrity is maintained by disk read error detection/correction means implemented in hardware. Data validity is maintained by checking the system generated CRC/checksum. After this level, the correct data is available and is it known to which card it belongs. Attaching a CRC/checksum to module data as part of a header allows the system to keep a validity check of the data as it moves through the system. From this point on, data validity is maintained by assuring data integrity.

4. Data transfer from memory to a card. Data integrity is maintained by a card and data signature (see below).

5. Card data physically transferred to a module. Data integrity is maintained by SDLC protocol/error detection.

6. Amount of data sent to a module must equal the amount of data expected by a module (data match). Module data match is maintained by including a FIR or FAILSAFE record in the data stream, or by the controller checking the system configuration when parsing data.

7. Type of data sent to a module must match the configuration of that module (configuration match). Module configuration match is maintained by including a FIR or FAILSAFE record in the data stream, or by the controller checking the system configuration when parsing data.

8. Cards cannot be added or removed from the production track without being detected (interlock protection). Each module monitors the card position and reports any change or break in the interlock between a card and its data to the controller. If the card/data interlock is broken, all cards are cleared from the track and discarded. A partially processed card may be placed in the input hopper, but may not be placed in the card track.

9. System access. The system controls all access to the operating system functions by monitoring and filtering all inputs.

In order to maintain data integrity and to insure that data sent to a module and the corresponding physical cards matches, a value, also known as a "signature", is computed for each data record in the controller. This signature consists of four components:

1. The module type, to insure the proper module type gets the data;

2. The module address, to insure the proper module gets correct data in the case of multiple modules of the same type;

3. The expected module card count, to match a particular data item to a particular card;

4. Data cyclical redundancy check (CRC), to assure valid data is sent.

The signature is sent along with the data to a module. The module then validates the signature using a complementary algorithm before placing any data on a card. By including the module identifier in the controller's computed signature, if the data arrives in the wrong module the module's computed signature will not match. Adding the signature value to the synchronization value insures that the controller and module evaluate data in the same order, and that a unique signature is calculated for each card regardless of the data. If there is a signature discrepancy, it is reported as an error to the controller.

ALGORITHM

Define:
$D(i)$ = Data for logical card i
$S(i)$ = Signature for logical card i (composed of parts 1-3 above)
$DS(i)$ = Data CRC (part 4 above)
$Q(k)$ = Item k in module data queue
$q$ = Module data queue depth minus 1
$e$ = Difference between expected physical card count and logical card count
$ct$ = Module actual card count Example: $S(j) = j + e + $ Module Address + Module Type The algorithm uses a signature composed of two separate components: parts 1-3 combined and part 4. When the controller prepares data to send, it computes the data signature $DS(i+q)$ and binds it to the data. The controller then determines the signature $S(i)$ for the card entering the module and binds that with the signature $DS(i)$ of the data to be placed on that card. The module then compares a computed card signature with the passed card signature and the stored and bound data signature with the passed data signature.

Controller:
PROCESS($D(i+q)$, $DS(i+q)$, $S(i)$, $DS(i)$)
Module: (normal processing)
1. $ct <= ct + 1$
2. $Q(q) <= $ Processed incoming data + incoming DATA signature
3. IF $S(i) = (ct + $ module address + type$)$ AND $(DS(Q(0)) = DS(i))$ THEN
4. Card receives data from $Q(0)$
5. ELSE
6. Signature Match Error
7. ENDIF
8. Push data queue For error recovery, this algorithm allows the controller to simply send a new card signature without going through a data queue refill process on that module.

Production Control

The control for card production resides entirely within the PCT, and is largely algorithmic. It depends on a given set of commands and a known set of parameters for each card processing module. The parameter set is sent to the PCT by each module when it is initialized. The command and parameter set is summarized in Table 1.

TABLE 1

| Cmd | Card Data | Card Sig. | Data Sig. | Card Queue | Data Queue | Input Card |
|-----|-----------|-----------|-----------|------------|------------|------------|
| A   | X         | X         | X         | push       | push       | affected   |
| B*  | X         | X         | —         |            | push       | transferred |
| C*  | X         | —         | X         |            | push       | none       |
| D*  | X         | —         | —         |            | push       | none       |
| E*  | —         | X         | X         | push       | push       | affected   |
| F   | —         | X         | —         |            | push       | transferred |
| G   | —         | —         | X         |            | push       | none       |
| H   | —         | —         | —         |            | push       | none       |

Key:
X item is present
— item is absent
*used only for multi-entry data queues

Table 1 fields:
1. Command: A control message sent to a module to request it to perform a given task or function. The eight commands are:
   A. Normal processing;
   B. Skip card and data pair;
   C. Fill data queue;
   D. Fill data queue;
   E. Last cards;
   F. Skip, last cards;
   G. Process with internal cards and data only;
   H. Process with internal cards and data only.
2. Card Data. Information used to process a card.
3. Card Signature. A value computed from a card's identifier used to insure data integrity.

4. Data Signature. A value computed from a card's data used to insure data integrity.

5. Card Queue Depth. The number of physical cards in a module at one time.

6. Data Queue Depth. The number of cards for which data is stored internally to the module during processing.

7. Incoming Card. What effect this command has on a card coming into this module.

A set of example system parameters is given in Table 2. These are used in the tables below to illustrate the system logic control flow over time.

TABLE 2

| Module | Card Queue Depth | Data Queue Depth | Module Type |
|---|---|---|---|
| 1 | 1 | 1 | Input Hopper |
| 2 | 1 | 1 | Magnetic Stripe |
| 3 | 1 | 3 | Graphics |
| 4 | 1 | 1 | Output Stacker |

For tables 3, 4, and 5, the entry syntax is
Command:Cardin_Signature/Datain_Signature=>-Cardout.

Table 3 shows a typical production scenario of processing six cards through the system.

Time 1. Module 1 receives command A and the card and data signatures for Card 1. Module 3 receives command D, no card signature, and data signature for Card 1. This allows Module 3 to fill its data queue with Card 1 data even though it will not be able to process Card 1 for another three time cycles.

Time 2. Module 1 receives command A and the card and data signatures for Card 2 while processing and transferring Card 1 to the next module. Module 2 receives command A and the card and data signature for Card 1. Module 3 receives command D, no card signature, and data signature for Card 2. Module 3 now has the data for cards 1 and 2 in its data queue.

Time 3. Module 1 receives command A and the card and data signatures for Card 3 while processing and transferring Card 2 to the next module. Module 2 receives command A and the card and data signatures for Card 2 while processing and transferring Card 1 to the next module. Module 3 receives command A and the Card 1 signature and Card 3 data signature. The data queue for Module 3 is now full.

Time 4. Module 1 receives command A and the card and data signatures for Card 4 while processing and transferring Card 3 to the next module. Module 2 receives command A and the card and data signatures for Card 3 while processing and transferring Card 2 to the next module. Module 3 receives command A and the Card 2 signature and Card 4 data signature while processing and transferring Card 1 to the next module. Module 4 receives command A and the card and data signatures for Card 1. As this is the last module, Card 1 is now finished.

Time 5. Module 1 receives command A and the card and data signatures for Card 5 while processing and transferring Card 4 to the next module. Module 2 receives command A and the card and data signatures for Card 4 while processing and transferring Card 3 to the next module. Module 3 receives command A and the Card 3 signature and Card 5 data signature while processing and transferring Card 2 to the next module. Module 4 receives command A and the card and data signatures for Card 2. Card 2 is now finished.

Time 6. Module 1 receives command A and the card and data signatures for Card 6 while processing and transferring Card 5 to the next module. Module 2 receives command A and the card and data signatures for Card 5 while processing and transferring Card 4 to the next module. Module 3 receives command A and the Card 4 signature and Card 6 data signature while processing and transferring Card 3 to the next module. Module 4 receives command A and the card and data signatures for Card 3. Card 3 is now finished.

Time 7. Module 1 receives command H and no card or data signatures and processes and transfers Card 6 to the next module. Module 2 receives command A and the card and data signatures for Card 6 while processing and transferring Card 5 to the next module. Module 3 receives command E and the Card 5 signature and no data signature while processing and transferring Card 4 to the next module. Module 4 receives command A and the card and data signatures for Card 4. Card 4 is now finished.

Time 8. Module 2 receives command H and no card or data signatures and processes and transfers Card 6 to the next module. Module 3 receives command E and the Card 6 signature and no data signature while processing and transferring Card 5 to the next module. Module 4 receives command A and the card and data signatures for Card 5. Card 5 is now finished.

Time 9. Module 3 receives command H and no card or data signatures and processes and transfers Card 6 to the next module. Module 4 receives command A and the card and data signatures for Card 6. Card 6 is now finished and the production run is complete, with cards 1 through 6 having been successfully made in nine time cycles.

TABLE 3

| Time | Module 1 | Module 2 | Module 3 | Module 4 | Out |
|---|---|---|---|---|---|
| 1 | A:1/1=>_ | | D:_/1=>_ Q[_,_,1] | | |
| 2 | A:2/2=>1 | A:1/1=>_ | D:_/2=> Q[_,1,2,] | | |
| 3 | A:3/3=>2 | A:2/2=>1 | A:1/3=>_ Q[1,2,3] | | |
| 4 | A:4/4=>3 | A:3/3=>2 | A:2/4=>1 Q[2,3,4] | A:1/1 | 1 |
| 5 | A:5/5=>4 | A:4/4=>3 | A:3/5=>2 Q[3,4,5] | A:2/2 | 2 |
| 6 | A:6/6=>5 | A:5/5=>4 | A:4/6=>3 Q[4,5,6] | A:3/3 | 3 |
| 7 | H:_/_=>6 | A:6/6=>5 | E:5/_=>4 Q[5,6,_] | A:4/4 | 4 |
| 8 | | H:_/_=>6 | E:6/_=>5 Q[6,_,_] | A:5/5 | 5 |
| 9 | | | H:_/_=>6 Q[_,_,_] | A:6/6 | 6 |

Error Processing and Remakes

Whenever a module detects an error which either prevents it from continuing a normal cycle or requires operator intervention, it returns a fatal error to the PCT and gives a summary status which reflects the general nature of the error. A module specific PCT process, with a name derived from the module's type and version, is called to further clarify and display the error. Error recovery will proceed depending on what mode the production process is in and the nature of the error.

Assume a logic error occurs with Card 3 at Time 4 in Module 2 of the previously discussed production run. Table 4 shows the normal remake scenario with no queue refill. In the following tables, N' signifies physical card N (logical card N−1), and N* signifies a bad card N.

Time 5. Module 1 receives command A and the Card 5' (logical Card 4) signature and Card 4 data signature while processing and transferring Card 4' (logical Card 3) to the next module. Module 2 receives command A and the Card 4' signature and Card 3 data signature while transferring the bad Card 3 to the next module. Module 3 receives command F and the Card 3 signature and no data signature while processing and transferring Card 2 to the next module. Note that the data queue for Module 3 is unchanged from that in time cycle 4. Module 4 receives command A and the card and data signatures for Card 2. Card 2 is now finished.

Time 6. Module 1 receives command A and the Card 6' signature and Card 5 data signature while processing and transferring Card 5' to the next module. Module 2 receives command A and the Card 5' signature and Card 4 data signature while processing and transferring Card 4' to the next module. Module 3 receives command A and the Card 4' signature and Card 5 data signature while transferring the bad Card 3 to the next module. Module 4 receives command A and the card and data signatures for bad Card 3. Bad Card is now out of the system.

Time 7. Module 1 receives command H and no card or data signatures and processes and transfers Card 6' to the next module. Module 2 receives command A and the Card 6' signature and Card 5 data signature while processing and transferring Card 5' to the next module. Module 3 receives command E and the Card 5' signature and no data signature while processing and transferring Card 4' to the next module. Module 4 receives command A and the Card 4' signature and Card 3 data signature. Card 4' is now finished (the replacement for logical Card 3).

Time 8. Module 2 receives command H and no card or data signatures and processes and transfers Card 6' to the next module. Module 3 receives command E and the Card 6' signature and no data signature while processing and transferring Card 5' to the next module. Module 4 receives command A and the Card 5' signature and Card 4 data signature for Card 4. Card 5' is now finished.

Time 9. Module 3 receives command H and no card or data signatures and processes and transfers Card 6' to the next module. Module 4 receives command A and the Card 6' signature and Card 5 data signature. Card 6' is now finished and the remake run is complete, with logical cards 1 through 5 having been successfully made in nine time cycles.

Table 5 shows the normal remake scenario with queue refill.

Time 5. Module 1 receives command A and the Card 5' (logical Card 4) signature and Card 4 data signature while processing and transferring Card 4' (logical Card 3) to the next module. Module 2 receives command A and the Card 4' signature and Card 3 data signature while transferring the bad Card 3 to the next module. Module 3 receives command B and the Card 3 signature and no data signature while processing and transferring Card 2 to the next module. Module 4 receives command A and the card and data signatures for Card 2. Card 2 is now finished.

Time 6. Module 3 receives command D and no card signature and Card 4 data signature while transferring the bad Card 3 to the next module. Module 4 receives command A and the card and data signatures for bad Card 3. Bad Card 3 is now out of the system.

Time 7. Module 1 receives command A and the Card 6' signature and Card 5 data signature while processing and transferring Card 5' to the next module. Module 2 receives command A and the Card 5' signature and Card 4 data signature while processing and transferring Card 4' to the next module. Module 3 receives command A and the Card 4' signature and Card 5 data signature, but does process or transfer any card since none is in the module.

Time 8. Module 1 receives command H and no card or data signatures and processes and transfers Card 6' to the next module. Module 2 receives command A and the Card 6' signature and Card 5 data signature while processing and transferring Card 5' to the next module. Module 3 receives command E and the Card 5' signature and no data signature while processing and transferring Card 4' to the next module. Module 4 receives command A and the Card 4' signature and Card 3 data signature. Card 4' is now finished (the replacement for logical Card 3).

Time 9. Module 2 receives command H and no card or data signatures and processes and transfers Card 6' to the next module. Module 3 receives command E and the Card 6' signature and no data signature while processing and transferring Card 5' to the next module. Module 4 receives command A and the Card 5' signature and Card 4 data signature for Card 4. Card 5' is now finished.

Time 10. Module 3 receives command H and no card or data signatures and processes and transfers Card 6' to the next module. Module 4 receives command A and the Card 6' signature and Card 5 data signature. Card 6' is now finished and the remarks run is complete, with logical cards 1 through 5 having been successfully made in ten time cycles.

TABLE 4

| Time | Module 1 | Module 2 | Module 3 | Module 4 | Out |
|---|---|---|---|---|---|
| 4 | A:4/4=>3 | A:3/3=>2 *ERROR* | A:2/4=>1 Q[2,3,4] | A:1/1 | 1 |
| 5 | A:5'/4=>4' | A:4'/3=>3* | F:3*/_=>2 Q[2,3,4] | A:2/2 | 2 |
| 6 | A:6'/5=>5' | A:5'/4=>4' | A:4'/5=>3* Q[3,4,5] | A:3*/3 | 3* |
| 7 | H:_/_=>6' | A:6'/5=>5' | E:5'/_=>4' Q[4,5,_] | A:4'/3 | 4' |
| 8 | | H:_/_=>6' | E:6'/_=>5' Q[5,_,_] | A:5'/4 | 5' |
| 9 | | | H:_/_=>6' Q[_,_,_] | A:6'/5 | 6' |

TABLE 5

| Time | Module 1 | Module 2 | Module 3 | Module 4 | Out |
|---|---|---|---|---|---|
| 4 | A:4/4=>3 | A:3/3=>2 *ERROR* | A:2/4=>1 Q[2,3,4] | A:1/1 | 1 |
| 5 | A:5'/4=>4' | A:4'/3=>3* | B:3*/3=>2 Q[3,4,3] | A:2/2 | 2 |
| 6 | | | D:_/4=>3* Q[4,3,4] | A:3*/3 | 3* |
| 7 | A:6'/5=>5' | A:5'/4=>4' | A:4'/5=> Q[3,4,5] | | |
| 8 | H:_/_=>6' | A:6'/5=>5' | E:5'/_=>4' Q[4,5,_] | A:4'/3 | 4' |
| 9 | | H:_/_=>6' | E:6'/_=>5' Q[5,_,_] | A:5'/4 | 5' |
| 10 | | | H:_/_=>6' | A:6'/5 | 6' |

TABLE 5-continued

| Time | Module 1 | Module 2 | Module 3 | Module 4 | Out |
|------|----------|----------|----------|----------|-----|
|      |          |          | Q[_,_,_] |          |     |

Every attempt is made to handle consumables warnings or errors in a manner which will waste few or no cards. This is done by the module 1) making a request for completion of those cards currently in process, 2) pausing to allow the operator to replace items, and 3) restarting the run.

COMMAND PROTOCOLS

Below is a list of the module commands, with their expected responses to the controller. All responses are expected to come asynchronously over the bus, so that once a command has been acknowledged, subsequent commands can be sent and the system will process responses as they come back.

| Command | Parameter(s) | Return Value(s) |
|---------|--------------|-----------------|
| ABORT | <none> | RESPONSE_HDR |
| CONFIG | module config data | RESPONSE_HDR |
| DATA | length, data | RESPONSE_HDR |
| DIAG | diagnostic subcommand | <module specific> |
| MODULE | module subcommand | RESPONSE_HDR |
| PROCESS | process subcommand | RESPONSE_HDR |
| RESET | <none> | RESPONSE_HDR, RESET_RESP |
| RESTART | <none> | RESPONSE_HDR |
| STATUS | summary or total | RESPONSE_HDR, LAST CMD ISSUED, MODULE SPECIFIC |
| WAIT_RESP | <none> | RESPONSE_HDR |
| PROCESS subcommands: | | |
| CARD_SIGN | card signature | SUB_CMD_RESP |
| DATA_SIGN | data signature | SUB_CMD_RESP |
| NEW_DATA | data | SUB_CMD_RESP |
| OLD_DATA | data | SUB_CMD_RESP |
| CONFIG_PROC |  | SUB_CMD_RESP |
| MORE_DATA | data | SUB_CMD_RESP |
| PROCESS_MOD_SCMD | SUB_CMD_RESP | |
| Define: | | |
| UCHAR | 1 byte | |
| WORD | 2 bytes | |
| RESPONSE_HDR structure: | | |
| UCHAR | SDLC_ADDRESS | Bus address of responding module |
| UCHAR | SDLC_STATE | Filled in by Comm code |
| UCHAR | COMMAND | Echo received command |
| WORD | PROC_ERR | Error flags, 16 bits |
| WORD | PROC_STATE | Module specific status info |
| WORD | CUS_RESP_LEN | Length of command response |
| WORD | CARD_CT | Module's card count |
| WORD | SENSORS | Sensor flags, 16 bits |
| Error status values for RESPONSE_HDR.PROC_ERR: | | |
| GENERAL_WARNING | 0001h | General miscellaneous warning |
| CONSUMABLE_ERR | 0002h | Consumable alert |
| DATA_ERR | 0004h | Error in data sent to module |
| XFER_IN_TIMEOUT | 0008h | Card expected, not received |
| XFER_OUT_ERR | 0010h | Error transferring card out |
| INTERLOCK_ON | 0100h | Interlock is broken |
| ILOCK_INTEGRITY | 0200h | Card or mechanism moved during interlock |
| COMMAND_ABORT | 0400h | Command aborted by controller |
| GENERAL_FAILURE | 0800h | General miscellaneous failure |
| INTEGRITY_ERROR | 2000h | Data/card signature mismatch |
| TRANSPORT_ERROR | 4000h | Transport error |
| PROCESS_ERR | 8000H | Error putting data on card |

Sensor state values are module dependent. The low order bits represent the state of the card position sensors. Bit 0 reflects cards positioned at the exit rollers. All position sensors start from bit 0 and progress up sequentially in bits, matching left->right bits with entry->exit position sensors in sequence as far as possible. The position sensor states are required as is the interlock state bit 15. For example, an Output Stacker with exit rollers has sensors at the exit, entry, and after the first stack (intermediate). It has a deflector home sensor, reject stack full, good stack full, and good stack empty. The sensor bits are defined as:

| Bit 0 | Exit card position |
| Bit 1 | Intermediate card position |
| Bit 2 | Entry card position |
| Bit 3 | Deflector home sensor |
| Bit 4 | Stack 1 full sensor |
| Bit 5 | Stack 1 empty sensor |
| Bit 6 | Reject full sensor |
| Bit 7 | Bus termination sensor |
| Bit 15 | Interlock state |

The DIAG command is used not only to query a particular module on a dedicated basis, but also to put the module in a diagnostic mode where it returns detailed information about itself.

COMMUNICATION INTERFACE

Communication between a module and the controller takes place over a serial port using a subset of the SDLC protocol. The SDLC packets (I-frames) that go between the controller and a module contain formally defined commands and responses. For every command issued from the controller, there is one expected response from the module upon completion of the requested task.

Below is a description of the serial bus control and a list of commands which every module must respond to, and a summary of their syntax and expected responses.

Serial Bus Control

The serial bus is a high-speed (2.0 Mbps) half-duplex communication channel operating under a subset of the SDLC protocol as defined by IBM. The serial bus controller for each module assumes the role of a secondary station, while the process controller's BIF acts as the primary station.

As a secondary station, the serial bus controller is responsible for receiving command frames from the primary station (SC) and generating the appropriate responses in a totally autonomous manner to all other modules. Upon receiving a command frame, the serial bus controller verifies the frame has been received in order, and is error-free. Error recovery on frames received with errors or out of order is handled by the serial bus controller. Upon receiving an error-free command frame, the serial bus controller examines the frame type to determine the processing requirements. A command frame may be either 1) a link control frame or 2) an information frame (I-frame).

A link control frame is processed entirely by the serial bus controller and remains totally transparent to all other processors on the logic board. Link control frames are continuously transmitted by the primary station on the serial bus and are used to poll the secondary stations and to pass link status information. Upon receiving a link control command frame, the serial bus controller decodes and processes the frame and generates the appropriate response to the primary station.

An information frame (I-frame) command received from the primary station contains a variable-length command packet requesting the module to perform a function. Upon receiving an error-free I-frame, the serial bus controller sends an acknowledgement of the successful receipt of the frame back to the primary station, and examines the contents of the I-frame to determine its function and destination processor.

To insure that card data and commands are sent to the correct modules, the modules are each uniquely identified. This result is achieved by assigning each communication processor within the system a unique address on the bus. Each of these communication processors is referred to as a node and in the preferred embodiment each node is assigned a unique address by the SC. Such a system for assigning module addresses is disclosed in patent application Ser. No. 07/575,077, filed Aug. 30, 1990, which is hereby incorporated by reference.

In addition to handling formal communications, each module must support the auto-addressing function. This requires each module to record the address sent from its input neighbor, increment it, and pass it on to the output neighbor.

A serial bus controller places each response I-frame destined for the SC in a queue until it receives the transmit opportunity from the primary station. A transmit opportunity is granted when the secondary station receives station is ready to receive data. Upon receiving the transmit opportunity, the serial bus controller 1) removes the oldest I-frame from the queue, 2) builds the appropriate SDLC header, and 3) initiates transmission of the frame to the primary station. The secondary station maintains the queued I-frame until the frame is acknowledged as being received successfully by the primary station.

Initialization

Reset
1. RESET
   Module Action:
   This command is sent to each module after the bus has been initialized or after a module error to enable correct module restart. Upon bus (BIF) initialization, the controller knows how many modules there are and what their bus address is. It then tells each module to logically wake up and report module specific information.

Module Response: All modules respond with the RESPONSE_HDR structure and the RESET_RESP structure given below:

| | | |
|---|---|---|
| UCHAR | MODULE_TYPE | See below |
| UCHAR | MODULE_MODEL | See below |
| WORD | MODULE_VERSION | Version number |
| UCHAR | DATA_QUEUE | Data queue length |
| UCHAR | CARD_QUEUE | Card queue length |
| WORD | MAX_RESPONSE | Max response length |
| WORD | MAX_DIAG_RESPONSE | Diag response length |
| MODULE_TYPE values: | | |
| UNKNOWN_MODULE | 0 | |
| INPUT_HOPPER | 1 | |
| OUTPUT_STACKER | 2 | |
| MAG_STRIPE | 3 | |
| EMBOSSER | 4 | |
| INDENT | 5 | |
| TOPPER | 6 | |
| EMBOSS_TOP | 7 | |
| GRAFX | 8 | |
| SMART_CARD | 9 | |
| INSERTER | 10 | |
| NUMBER_MOD_TYPES | INSERTER | |
| MODULE_MODEL values: | | |
| SINGLE_STACK | 1 | |
| DOUBLE_STACK | 2 | |
| EMBOSS_ONLY | 3 | |
| EMBOSS_INDENT | 4 | |
| IMPACT_PRINT | 3 | |
| NON_IMPACT_PRINT | 4 | |
| OUT_STACK_EXIT | 3 | |

Status and Error Protocol

Status
1. STATUS summary:
   Module Action:
   If *summary* is TRUE, only the fixed length portion of the status information common to all modules is sent. If *summary* is FALSE, a module specific data record will be sent following the fixed length status.
   Module Response:
   If status "SUMMARY" is requested, the RESPONSE_HDR structure plus the last command issued is returned. If "COMPLETE" is requested, RESPON- SE_HDR, the last command issued, and module specific status are returned.

Diagnostic Protocols

In order to present a standardized appearance to the PCS, the diagnostic or debug interface has a standard interface across all modules. This set of functions will have particulars which vary greatly from module to module, but at a minimum each module supports 1) individual motor and solenoid control, 2) monitoring of each available sensor, 3) independent triggering of the PROCESS step, and 4) an exhaustive test and status reporting capability.

SYSTEM CONTROLLER INTERFACE

For any functions which require module specific processing, the module supplies a dynamically linked library (DLL) of these routines to the controller. The routine names are formed from the module name, version, and function. For example, a graphics module, with the name GRAFX, version 1.23, with a special diagnostic function, would create the function:

GRAFX_123_diag()

A partial list of allowable functions is:

| | |
|---|---|
| ..._diag(...) | Diagnostics. |
| ..._status(...) | Status display and evaluation. |
| ...)recover(...) | Error recovery. |
| ...)control)...) | Unique process control function. |
| ...)pause(...) | Data pausing command. |
| ...)config(...) | Small batch reconfiguration. |
| ...)init(...) | Process initialization. |

At the completion of each personalization operation, the system controller sends new card data over the serial bus to each of the modules. If the preceding encoding operation has been successfully completed, the system controller issues a command to all of the modules to cause them to transfer or shift the cards into the neighboring module. Each module performs a separate card processing function and transcribes a segment of the total card data onto the card.

Sequential encoding or embossing is well known in the art, and the mechanical structures required to emboss and transfer cards are also well known in the art. One structure suitable for carrying out the encoding and transferring operations is taught by U.S. Pat. No. 3,820,455, issued Jun. 28, 1974 to Hencly, R. et al., which is owned by the assignee of the present invention and which is incorporated by reference herein. The Hencly patent teaches the use of mechanically interconnected modules or stations operating under the control of an operating system which 1) periodically requests data from a magnetic tape unit, 2) operates to emboss or encode the card data onto the cards, and then 3) transfers the card to the next station.

In summary, the system controller contains 1) a buffer for storing messages to transmit to and receive from card encoding modules, and 2) a data channel to transmit those messages to and from card encoding modules. Each card encoding module contains 1) a buffer for storing messages to transmit to and receive from the system controller, 2) a local processor for controlling encoding functions, 3) processor memory for storing card data during encoding, 4) function specific elements that respond to control signals to encode the card data contained in memory onto the cards, and 5) a data channel to transfer card data between the data buffer and processor memory.

One important feature of this structure and organization is that the encoding operations can occur concurrently with the transfer of card data into the modules. Since data communication along the bus is much faster than the card encoding operations, the modules typically do not need to wait for the next card data. Consequently this feature permits the system to operate at a speed dictated by the slowest module. This feature also enhances the modularity of the system since the operating speed of the modules does not affect the transfer of card data. The independence of the control of the mechanical operation of each module from the control of its neighbor permits the rapid and efficient assembly of application specific encoding machines.

It is to be understood, however, that even though numerous characteristics and advantages of the invention have been set forth in the foregoing description, together with details of the structure and function of the invention, the disclosure is illustrative only, and changes may be made in detail, especially in matters of shape, size, and arrangement of parts within the principles of the invention, to the full extent indicated by the broad general meaning of the terms in which the appended claims are expressed.

What is claimed is:

1. A card processing system used to produce information bearing cards comprising:
   (a) a system controller means for transferring information to and from card processing module means;
   (b) a plurality of said card processing module means for processing said cards and for sequentially transferring cards through said card processing module means;
   (e) said system controller means including:
      (i) communication means including buffer means for storing messages for transmission to said card processing module means and for storing messages received from said card processing module means;
      (ii) means for transfer card data into said buffer means for transmission to said card processing module means;
   (f) each of said card processing module means including:
      (i) communication means including buffer means for storing messages from said system controller means and for storing messages for transmission to said system controller;
      (ii) local processor means for generating control signal for controlling processing means;
      (iii) processor memory means for storing said card data during processing;
      (iv) processing means responsive to said control signals for processing card data stored in said processor memory means onto said cards;
      (v) memory transfer means for loading card data from said buffer means into said processor memory means.

2. A card processing system in accordance with claim 1, further including input hopper module means for transferring cards to the card processing modules under control of the system controller means.

3. A card processing system in accordance with claim 3, further including output hopper module means for storing cards processed by the card processing modules.

4. A card processing system according to claim 2, wherein said input hopper module comprises:

stacking means having a front end and a rear end for storing said cards in a stacked configuration, said cards each having opposing facing major surfaces and a top, bottom, first, and second side edge, said cards resting on their bottom edges in said stacking means;

card pusher means for biasing said cards toward said front end of said stacking means;

card picker means for separation of a lead card proximate said front end of said stacking means; and said stacking means comprising a bottom support plate member, a right side guide rail member and a left side guide rail member, said guide rail members being parallel to each other, said stacking means including means for permitting temporary displacement of said guide rail members from a normal position to a displaced position so as to accommodate unassociated card storage means of greater width than said cards.

5. The card processing system according to claim 1 wherein said system controller means includes means for computing a data signature from:

(i) an identifier associated with said card processing module means with each said card processing module means having a unique identifier;

(ii) a synchronization value;

(iii) a value computed from said card data.

6. The card processing system according to claim 5 wherein said unique identifier for each said card processing module means consists of the type of said card processing module means and bus address for said card processing module means.

7. The card processing system according to claim 5 wherein said synchronization value is independently sequentially incremented in said system controller means and said card processing module means.

8. The card processing system according to claim 5 wherein said computed card data value is a cyclical redundancy check (CRC) of said card data.

9. A card processing system according to claim 1, wherein said plurality of said card processing module means includes an indent module used to indent characters onto a surface of the cards, said indent module comprising:

a support framework;

a printing tape supply reel;

a printing tape takeup reel;

a drive motor for driving said takeup reel;

indent module control means for controlling operation of the drive motor;

sensor means for sensing the diameter of tape accumulating on said tape takeup reel, and for providing a signal representative of the diameter to the control means; and wherein the control means in response to changes in the diameter adjusts the drive motor such that a constant amount of the printing tape is taken up by the takeup reel between characters as they are indented onto the card.

10. A card processing system according to claim 1, wherein said plurality of said card processing module means includes an inserter module attaching processed cards to associated card carrier forms having predetermined cardholder information printed thereon, said inserter module including:

a chassis;

printer means for printing predetermined cardholder information on serially connected card carrier forms, said printer means including a printer and modulating means for interchangeably mounting said printer so as to allow interchangeable use of different printers;

takeup means for maintaining proper takeup of said serially connected carrier forms as they exit said printer means;

bursting means for separating said serially connected carrier forms after printing;

inserter means for attaching said processed cards to associated printer carrier forms.

11. A card processing system used to encode card data onto cards, comprising a system controller and a plurality of card processing modules which can be assembled in an arbitrary sequence to perform application specific card processing functions, each of said modules including a common mechanical interface means for mechanically interconnecting said modules, a common electrical power bus interface means for electrically interconnecting said modules so as to provide power to said modules, and common communications bus interface means for electrically interconnecting said modules so as to enable communication with said system controller.

12. A card processing system according to claim 11, further comprising:

(a) control means in said system controller for transferring information to and from said card processing modules; and (d) wherein said card processing modules include module control means for processing said cards at said card processing modules and for communicating with said control means.

13. A card processing system according to claim 11, wherein said common electrical power bus interface means of each of said card processing modules includes a power distribution board.

14. A card processing system according to claim 13, wherein said modular power supply means comprises:

(a) a housing for mounting said modular power supply means at said system controller;

(b) a power cord suited to the available power source;

(c) an electro-magnetic interference filter;

(d) a circuit breaker; and power to said system controller and to said electrical power bus interface means.

15. A card processing system according to claim 11, wherein said common electrical power bus interface means of each of said card processing modules includes at least a two wire cable used for interconnecting said power distribution circuit board to a power distribution circuit board of an adjacent card processing module.

16. A card processing system according to claim 11, wherein said system controller includes interchangeable modular power supply means so as to permit interchangeable configuration to suit the available power source.

17. A card processing system according to claim 16, wherein said bottom panel of said system controller circuit board housing is situated at a 45 degree angle relative to said front plane of said housing.

18. A card processing system according to claim 11, wherein said system controller includes a removable system controller circuit board housing comprising:

a top panel;

a left side panel and a right side panel;

a bottom panel situated at an acute angle relative to a front plane of said housing; and said bottom panel including an access panel being formed substantially at a right angle to said bottom panel, said access panel having openings for accessing circuit boards ports and allowing air flow through said housing.

19. A card processing module for processing card data onto a plastic card, comprising:

a module chassis having left and right sides, said left side conforming to said right side so as to enable alignment of a series of like modules, said module chassis including a transverse central air plenum;

a card processing mechanism for processing data onto said cards, said card processing mechanism is mounted on a top surface of said module chassis;

a card transport mechanism including an inlet and an outlet, said inlet having means for entering said cards into said card processing mechanism from a previous module, said outlet having means for exiting processed cards from said card processing mechanism, said inlet and outlet being aligned so as to permit unobstructed flow of cards through a card path established by arranging a series of like modules;

an electric bus interface for supplying power to said module including a power distribution circuit board;

a communication bus interface for sending or receiving control signals to and from a system controller;

module control means for receiving, storing, and transmitting data to and from said system controller; and logic control means for interpreting control signals from said system controller.

20. A card processing module for processing card data onto a plastic card, comprising:

a module chassis;

a card processing mechanism for processing data onto said cards;

a card transport mechanism;

an electric bus interface for supplying power to said module;

a communication bus interface for sending or receiving control signals to and from a system controller;

module control means for receiving, storing, and transmitting data to and from said system controller, said module control means comprising;

(a) a communication process means including means for storing data and including means for transmitting and receiving data to and from the external system controller and including means for transmitting and receiving data internally directly from said means for storing data;

(b) a module process means including means for transmitting and receiving data to and from said communication processor means and including means for generating control signals;

(c) a card process means including means for receiving control signals from said module processor means and including card processing means and including a means for transferring a card; and logic control means for interpreting control signals from said system controller, said logic control means comprising a module processor means including means for receiving commands and data from the external system controller and including means for interpreting said commands to determine what function to perform and including means for generating appropriate control signals for said card processing means and including means for storing the status for said module means and including means for transmitting said status to said external system controller.

21. A card processing system used to produce information bearing cards comprising:

(a) logic control system means for interfacing an operator to the rest of said car processing system including means for further coordinating the operation of said card processing system;

(b) data input means for receiving commands from said logic control system means and including means for accessing said card data from a variety of external data storage device means;

(c) a plurality of card processing module means for processing said cards;

(d) production control system means for receiving commands from said logic control system means and including means for accessing said card data from a system data storage device means and including means for further coordinating the operation of said card processing module means.

22. A method for producing information bearing cards from a logic control system means and a data input means and a production control system means and a plurality of card processing module means which are electrically and logically and mechanically connected, the method comprising the steps of:

(a) said logic control system means initializing the bus interface and serial controller and bus of said production control system means and of said card processing module means;

(b) said logic control system means configuring said production control system means and said card processing module means to correctly produce finished cards with the attributes selected by an operator;

(c) said production control system means controlling the processing of cards in said card processing module means.

23. A card processing system used to encode card data onto cards, comprising a system controller, a plurality of card processing modules of different types connected by a common communications means, a plurality of common process control commands and a common response protocol, where said system controller sends any number of said plurality of process control commands to any number of said plurality of card processing modules without regard for the type of the said card processing module, and each of said card processing modules sends a response to said system controller using the same said response protocol.

24. A card processing system used to encode card data onto cards, comprising a system controller and a plurality of card processing modules which can be assembled in an arbitrary sequence to perform application specific card processing functions, each of said modules including a common process control interface means for logically controlling said modules, where said process control interface means consists of a modular dynamic linked library means.

25. A card processing system used to encode card data onto cards, comprising a system controller, a plurality of card processing modules of different types connected by a common communications means, process control means for said modules to automatically send module type information to said system controller through said common communications means upon power-up or reset, and process control means for said system controller to automatically receive said type information from said communications means upon said module power-up or reset.

26. A modular chassis for supporting card processing equipment; comprising:

a generally I-shaped support frame;

corresponding alignment means for aligning the modular chassis, the alignment means including cooperating alignment tabs and slots, the tabs being receivable in the slots;

apertures for insertion therethrough of threaded fasteners; and a central air plenum extending through a mid-portion of the modular chassis.

* * * * *

(12) EX PARTE REEXAMINATION CERTIFICATE (7477th)
United States Patent
Warwick et al.

(10) Number: US 5,266,781 C1
(45) Certificate Issued: May 4, 2010

(54) MODULAR CARD PROCESSING SYSTEM

(75) Inventors: Dennis J. Warwick, Richfield, MN (US); Robert W. Lundstrom, Plymouth, MN (US); Joseph Zaloker, Columbia Heights, MN (US); Gary Mattila, St. Louis Park, MN (US); Benjamin H. Sannel, New Hope, MN (US); Steven G. Dorfe, New Hope, MN (US); Theresa J. McNamara, Robbinsdale, MN (US); Jeffrey P. Johnson, Rogers, MN (US); Glenn R. Carney, Eagan, MN (US); Steven A. Miller, Mahtomedi, MN (US)

(73) Assignee: Datacard Corporation, Minnetonka, MN (US)

Reexamination Request:
No. 90/008,201, Aug. 31, 2006

Reexamination Certificate for:
Patent No.: 5,266,781
Issued: Nov. 30, 1993
Appl. No.: 07/745,597
Filed: Aug. 15, 1991

(51) Int. Cl.
*G06K 5/00* (2006.01)
*G06F 17/00* (2006.01)
*B31F 1/07* (2006.01)
*B41J 15/00* (2006.01)
*B41J 33/00* (2006.01)

(52) U.S. Cl. .................. 235/375; 101/32; 235/380; 400/621; 400/221

(58) Field of Classification Search .................. None
See application file for complete search history.

(56) References Cited

U.S. PATENT DOCUMENTS

| | | | |
|---|---|---|---|
| 3,744,031 A | 7/1973 | Avery et al. | |
| 4,025,906 A | 5/1977 | Riikonen | |
| 4,058,056 A | 11/1977 | Rubin | |
| 4,233,661 A | 11/1980 | Bolton et al. | |
| 4,268,901 A | 5/1981 | Subrizi et al. | |
| 4,485,437 A | 11/1984 | Kinghorn | |
| 4,636,947 A | 1/1987 | Ward | |
| 4,660,141 A | 4/1987 | Ceccon et al. | |
| 4,672,891 A | 6/1987 | Maurer et al. | |
| 4,686,898 A | 8/1987 | LaManna et al. | |
| 4,707,790 A | 11/1987 | Gomes et al. | |
| 4,750,136 A | 6/1988 | Arpin et al. | |
| 4,755,069 A | 7/1988 | LaManna et al. | |
| 4,760,553 A | 7/1988 | Buckley et al. | |
| 4,773,005 A | 9/1988 | Sullivan | |
| 4,787,028 A | 11/1988 | Finfrock et al. | |
| 4,800,504 A | 1/1989 | Durst, Jr. et al. | |
| 5,012,076 A | 4/1991 | Yoshida | |
| 5,920,055 A | 7/1999 | Roth et al. | |

FOREIGN PATENT DOCUMENTS

EP    03 11 417    4/1989

OTHER PUBLICATIONS

Texas Instrument "TMS 9995 16–Bit Microcomputer Data Manual" (Aug. 1982).
McVey, JM "Programmable Identification for I/O Devices", IBM Technical Disclosure Bulletin: Aug. 1979; pp. 882–883.
Randall, DL "Power–On Self Testing for Multi–Tasking Personal Computers"; IBM Techinical Disclosure Bulletin; May 1990; pp. 95–98.
Widdoes, Jr., Lawrence D.; "The Minerva Multi–Processor"; ISCA 1976; pp. 34–39.

*Primary Examiner*—Mary Steelman

(57) ABSTRACT

Standardized card processing modules are mechanically and electrically interconnected to form an application specific card personalization machine. A controller is coupled to a communication bus which permits the controller to download card data to the card processing modules and to upload status information from the card processing modules. Each one of the card processing modules performs a different encoding or personalization function under the control of a local processor.

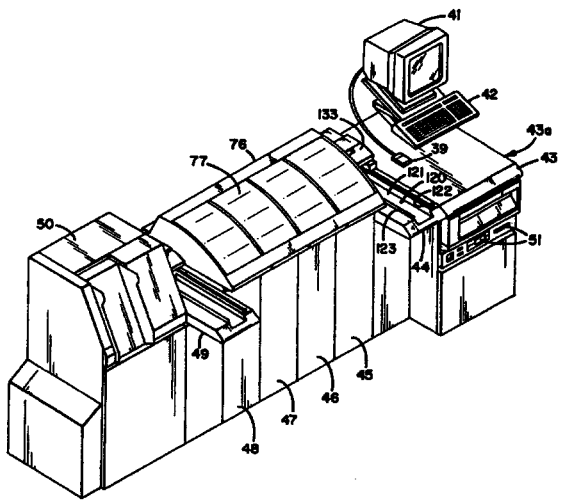

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 20, 22 and 25 is confirmed.

Claims 3 and 21 are determined to be patentable as amended.

Claims 4–19, 23, 24 and 26 were not reexamined.

3. A card processing system in accordance with claim [3] *2*, further including output hopper module means for storing cards processed by the card processing modules.

21. A card processing system used to produce information bearing cards comprising:
   (a) logic control system means for interfacing an operator to the rest of said [car] *card* processing system including means for further coordinating the operation of said card processing system;
   (b) data input means for receiving commands from said logic control system means and including means for accessing said card data from a variety of external data storage device means;
   (c) a plurality of card processing module means for processing said cards;
   (d) production control system means for receiving commands from said logic control system means and including means for accessing said card data from a system data storage device means and including means for further coordinating the operation of said card processing module means.

* * * * *